United States Patent
Lee et al.

(10) Patent No.: US 9,887,037 B2
(45) Date of Patent: *Feb. 6, 2018

(54) METHOD FOR DECIDING COMMUNICATION PROTOCOL BETWEEN WIRELESS POWER TRANSMITTER AND WIRELESS POWER RECEIVER

(71) Applicant: LG Electronics Inc., Seoul (KR)

(72) Inventors: Hyunbeom Lee, Seoul (KR); Jaesung Lee, Suwon-Si (KR); Yong-Cheol Park, Gwacheon-Si (KR); Jeongkyo Seo, Anyang-Si (KR)

(73) Assignee: LG ELECTRONICS INC., Seoul (KR)

( * ) Notice: Subject to any disclaimer, the term of this patent is extended or adjusted under 35 U.S.C. 154(b) by 696 days.

This patent is subject to a terminal disclaimer.

(21) Appl. No.: 13/649,936

(22) Filed: Oct. 11, 2012

(65) Prior Publication Data

US 2013/0288595 A1  Oct. 31, 2013

Related U.S. Application Data

(60) Provisional application No. 61/638,286, filed on Apr. 25, 2012.

(51) Int. Cl.
| H04B 7/24 | (2006.01) |
| H01F 38/14 | (2006.01) |
| H04W 88/02 | (2009.01) |
| H04B 5/00 | (2006.01) |

(52) U.S. Cl.
CPC .......... *H01F 38/14* (2013.01); *H04B 5/0037* (2013.01); *H04B 5/0081* (2013.01); *H04W 88/02* (2013.01)

(58) Field of Classification Search
CPC ............................ H04B 5/0037; H04B 5/0081
USPC ........................................................ 455/39
See application file for complete search history.

(56) References Cited

U.S. PATENT DOCUMENTS

| 7,457,382 B1 * | 11/2008 | Jones, IV ............. H04L 1/1829 375/347 |
| 8,411,956 B2 * | 4/2013 | McGatha ............. G06F 17/211 382/182 |
| 8,441,956 B2 * | 5/2013 | Misumi ................. B63H 21/22 340/7.29 |
| 2009/0017861 A1 * | 1/2009 | Wu ..................... H04W 52/246 455/522 |

(Continued)

*Primary Examiner* — Raj Chakraborty
(74) *Attorney, Agent, or Firm* — Birch, Stewart, Kolasch & Birch, LLP

(57) ABSTRACT

This specification provides a method for deciding a communication protocol between a wireless power transmitter and a wireless power receiver. To this end, a method for deciding a communication protocol by the wireless power receiver for data transmission or reception with the wireless power transmitter includes transmitting first communication protocol information indicating communication protocols supportable by the wireless power receiver itself to the wireless power transmitter, and deciding a communication protocol for the data transmission or data reception based on second communication protocol information, which indicates communication protocols selected based on the first communication protocol information, when the second communication protocol information is received from the wireless power transmitter.

25 Claims, 21 Drawing Sheets

(56) References Cited

U.S. PATENT DOCUMENTS

| | | | |
|---|---|---|---|
| 2009/0323588 A1* | 12/2009 | Aghili | H04L 27/0012 370/328 |
| 2011/0069697 A1* | 3/2011 | Sim | H04W 16/14 370/350 |
| 2011/0127951 A1* | 6/2011 | Walley | H02J 7/025 320/108 |
| 2011/0177787 A1 | 7/2011 | Hwang et al. | |

* cited by examiner

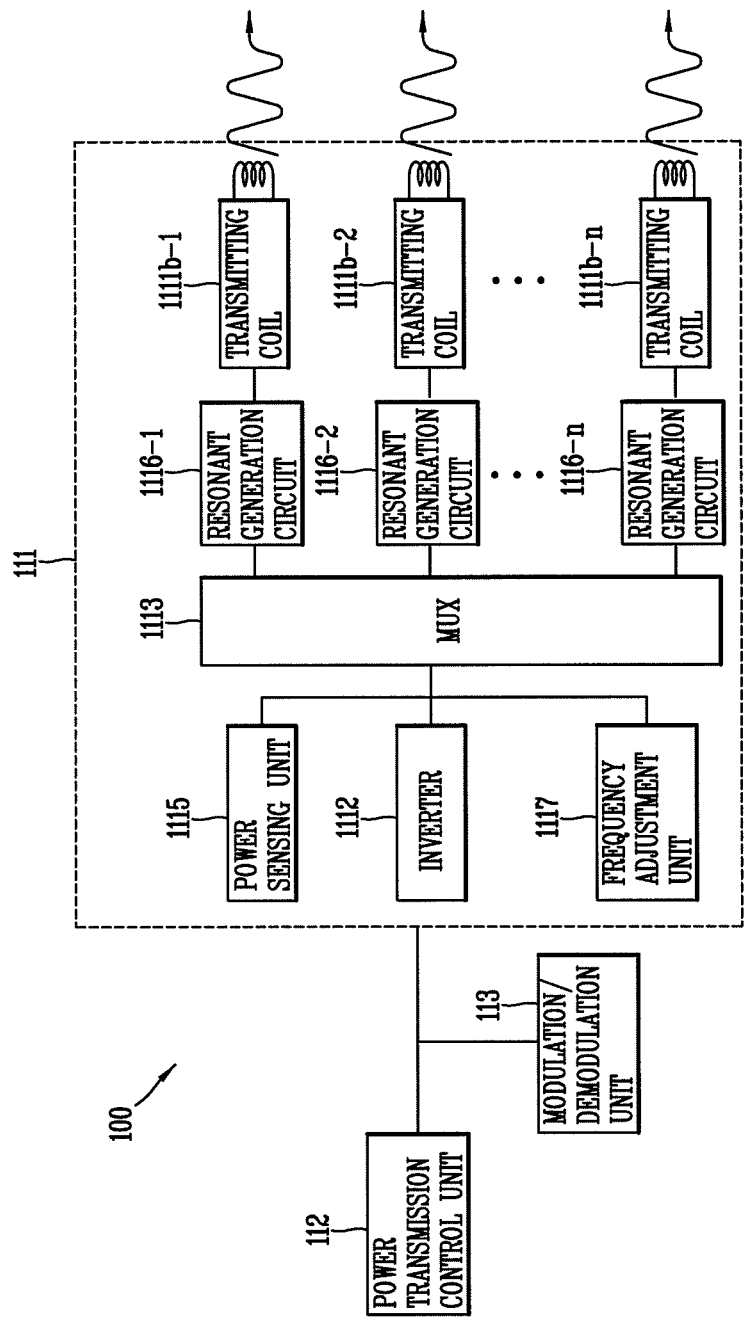

FIG. 21

| COMMUNICATION PROTOCOL | PROTOCOL NO. |
|---|---|
| ASK/NRZI | 0x01 |
| ASK/NRZ-L | 0x02 |
| FSK/MANCHESTER | 0x03 |
| FSK/NRZI | 0x04 |
| ⋮ | ⋮ |
| ZIGBEE | 0x10 |
| BLUETHOOTH | 0x11 |
| ⋮ | ⋮ |

FIG. 22

| b7 | b6 | b5 | b4 | b3 | b2 | b1 | b0 |
|---|---|---|---|---|---|---|---|
| COMMUNICATION DIRECTION | COMMUNICATION PROTOCOL NO. | | | | | | |

FIG. 23

| | b7 | b6 | b5 | b4 | b3 | b2 | b1 | b0 |
|---|---|---|---|---|---|---|---|---|
| B0 | COMMUNICATION DIRECTION | COMMUNICATION PROTOCOL NO. | | | | | | |
| B1 | COMMUNICATION DIRECTION | COMMUNICATION PROTOCOL NO. | | | | | | |
| B2 | COMMUNICATION DIRECTION | COMMUNICATION PROTOCOL NO. | | | | | | |
| B3 | COMMUNICATION DIRECTION | COMMUNICATION PROTOCOL NO. | | | | | | |

FIG. 24

| HEADER* | PACKET TYPES | MESSAGE SIZE |
|---|---|---|
| PING PHASE | | |
| 0x01 | SIGNAL STRENGTH | 1 |
| IDENTIFICATION & CONFIGURATION PHASE | | |
| 0x06 | POWER CONTROL HOLD-OFF | 1 |
| 0x51 | CONFIGURATION | 5 |
| 0x71 | IDENTIFICATION | 7 |
| 0x81 | EXTENDED IDENTIFICATION | 8 |
| POWER TRANSFER PHASE | | |
| 0x02 | END POWER TRANSFER | 1 |
| 0x03 | CONTROL ERROR | 1 |
| 0x04 | RECTIFIED POWER | 1 |
| 0x05 | CHARGE STATUS | 1 |
| IDENTIFICATION & CONFIGURATION POWER TRANSFER PHASE | | |
| 0x18 | PROPRIETARY | 1 |
| 0x19 | PROPRIETARY | 1 |
| 0x28 | PROPRIETARY | 2 |
| 0x29 | PROPRIETARY | 2 |
| 0x38 | PROPRIETARY | 3 |
| 0x48 | PROPRIETARY | 4 |
| 0x58 | PROPRIETARY | 5 |
| 0x68 | PROPRIETARY | 6 |
| 0x78 | PROPRIETARY | 7 |
| 0x84 | PROPRIETARY | 8 |
| 0xA4 | PROPRIETARY | 12 |
| 0xC4 | PROPRIETARY | 16 |
| 0xE2 | PROPRIETARY | 20 |
| 0xF2 | PROPRIETARY | 24 |

|    | b7 | b6 | b5 | b4 | b3 | b2 | b1 | b0 |
|----|----|----|----|----|----|----|----|----|
| B0 | POWER CLASS | | MAXIMUM POWER | | | | | |
| B1 | RESERVED | | | | | | | |
| B2 | PROP | RESERVED | | | COUNT | | | |
| B3 | RESERVED | | | | | | | |
| B4 | RESERVED | | | | | | | |

METHOD FOR DECIDING COMMUNICATION PROTOCOL BETWEEN WIRELESS POWER TRANSMITTER AND WIRELESS POWER RECEIVER

CROSS-REFERENCE TO RELATED APPLICATIONS

Pursuant to 35 U.S.C. § 119(e), this application claims the benefit of earlier filing date and right of priority to U.S. Provisional Application No. 61/638,286 (hereinafter the '286 Provisional), filed on Apr. 25, 2012, the contents of which is incorporated by reference herein in its entirety.

BACKGROUND OF THE INVENTION

Field of the Invention

The present disclosure relates to wireless charging, and more particularly, wireless charging according to a charging characteristic.

Description of the Related Art

In recent years, the method of contactlessly supplying electrical energy to electronic devices in a wireless manner has been used instead of the traditional method of supplying electrical energy in a wired manner. The electronic device receiving energy in a wireless manner may be directly driven by the received wireless power, or a battery may be charged by using the received wireless power, then allowing the electronic device to be driven by the charged power.

SUMMARY OF THE INVENTION

Therefore, an aspect of this specification is to provide a method for deciding (or selecting) a communication protocol between a wireless power transmitter and a wireless power receiver.

In accordance with the embodiments disclosed herein, there is provided a method for deciding a communication protocol by a wireless power receiver for data transmission or data reception with a wireless power transmitter, the method including transmitting first communication protocol information to the wireless power transmitter, the first communication protocol information indicating communication protocols supportable by the wireless power receiver itself, and deciding a communication protocol for the data transmission or data reception based on second communication protocol information when the second communication protocol information is received from the wireless power transmitter, the second communication protocol information indicating communication protocols selected based on the first communication protocol information.

In one exemplary embodiment, the first communication protocol information may include a communication protocol list in which communication protocols supportable by the wireless power receiver are listed.

In one exemplary embodiment, the communication protocols supportable by the wireless power receiver may be selected from predetermined communication protocols included in a communication protocol catalog.

In one exemplary embodiment, the second communication protocol information may include a communication protocol list in which communication protocols selected based on the first communication protocol information are listed.

In one exemplary embodiment, when the selected communication protocols are in plurality, the decision of the communication protocol may be executed based on positions of the selected communication protocols in the communication protocol list containing the selected communication protocols.

In one exemplary embodiment, the method may further include performing the data transmission or data reception with the wireless power transmitter based on the decided communication protocol.

In one exemplary embodiment, the transmitting of the first communication protocol information to the wireless power transmitter may include generating a packet including the first communication protocol information, and transmitting the generated packet to the wireless power transmitter.

In one exemplary embodiment, the packet may be transmitted by modulating a wireless power signal generated by the wireless power transmitter to include the packet.

In one exemplary embodiment, the packet may be transmitted by a communication module provided in the wireless power receiver.

In one exemplary embodiment, the communication module may support at least one of Zigbee, Bluetooth and Near Field Communication (NFC).

In one exemplary embodiment, the first communication protocol information or the second communication protocol information may include communication direction information and a communication protocol number indicating the type of communication protocol.

In one exemplary embodiment, the communication direction information may include information indicating a first direction that data is transmitted from the wireless power transmitter to the wireless power receiver, and a second direction that data is transmitted from the wireless power receiver to the wireless power transmitter.

In one exemplary embodiment, the selected communication protocols may include a communication protocol corresponding to the first direction and a communication protocol corresponding to the second direction.

In one exemplary embodiment, the first communication protocol information or the second communication protocol information may be 7-bit information. Here, the communication direction information may be 1-bit information, and the communication protocol number information may be 6-bit information.

In one exemplary embodiment, the method may further include performing the data transmission or data reception with the wireless power transmitter based on a reference communication protocol upon failure of the reception of the second communication protocol information from the wireless power transmitter.

In one exemplary embodiment, the reference communication protocol may be a communication protocol for ensuring data transmission or data reception between the wireless power transmitter and the wireless power receiver.

In accordance with the embodiments disclosed herein, there is provided a method for deciding a communication protocol by a wireless power transmitter for data transmission or data reception with a wireless power receiver, the method including deciding a communication protocol based on first communication protocol information upon reception of the first communication protocol information from the wireless power receiver, the first communication protocol indicating communication protocols supportable by the wireless power receiver, and transmitting second communication protocol information to the wireless power receiver, the second communication protocol information indicating the decided communication protocol.

In one exemplary embodiment, the method may further include performing the data transmission or data reception based on the decided communication protocol.

In one exemplary embodiment, the transmitting of the second communication protocol information to the wireless power receiver may include generating a packet including the second communication protocol information, and transmitting the generated packet to the wireless power receiver.

In one exemplary embodiment, the packet may be transmitted by generating a wireless power signal which has been modulated to include the packet.

In one exemplary embodiment, the packet may be transmitted by a communication module provided in the wireless power transmitter.

In one exemplary embodiment, the communication module may support at least one of Zigbee, Bluetooth and NFC.

In one exemplary embodiment, the first communication protocol information or the second communication protocol information may include communication direction information and a communication protocol number indicating a type of the communication protocol.

In one exemplary embodiment, the method may further include performing the data transmission or data reception with the wireless power receiver based on a reference communication protocol upon failure of the reception of the first communication protocol information from the wireless power receiver.

In one exemplary embodiment, the reference communication protocol may be a communication protocol for ensuring the data transmission or data reception between the wireless power transmitter and the wireless power receiver.

In accordance with the embodiments disclosed herein, there is provided a wireless power receiver for receiving power from a wireless power transmitter in a wireless manner by receiving a wireless power signal, the receiver including a power receiving unit configured to receive the wireless power signal; and a power reception control unit configured to transmit first communication protocol information to the wireless power transmitter, the first communication protocol information indicating communication protocols supportable by the wireless power receiver, and decide a communication protocol for data transmission or data reception for receiving the wireless power signal based on second communication protocol information upon receiving the second communication protocol information from the wireless power transmitter, the second communication protocol information indicating communication protocols selected based on the first communication protocol information.

In one exemplary embodiment, the power reception control unit may generate a packet including the first communication protocol information, and the power receiving unit may modulate the wireless power signal to include the packet.

In one exemplary embodiment, the receiver may further include a communication module configured to transmit the first communication protocol information to the wireless power transmitter and receive the second communication protocol information from the wireless power transmitter.

In accordance with the embodiments disclosed herein, there is provided a wireless power transmitter for transferring power to a wireless power receiver in a wireless manner by generating a wireless power signal, the method including a power conversion unit configured to generate the wireless power signal, and a power transmission control unit configured to decide a communication protocol for data transmission or data reception for transmitting the wireless power signal based on first communication protocol information upon receiving the first communication protocol information from the wireless power receiver, the first communication protocol information indicating communication protocols supportable by the wireless power receiver, and transmit second communication protocol information to the wireless power receiver, the second communication protocol information indicating the decided communication protocol.

According to a method for deciding a communication protocol between a wireless power transmitter and a wireless power receiver in accordance with one exemplary embodiment of this specification, it may be advantageous to extend an application range of a wireless power transfer system by providing a method for deciding (or selecting) a specific communication protocol of a plurality of communication protocols so as to allow for use of the plurality of communication protocols, in a data communication between the wireless power transmitter and the wireless power receiver.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 8 is a block diagram illustrating a wireless power transmitter configured to have one or more transmission coils receiving power according to a resonance coupling method that can be employed in the embodiments disclosed herein;

FIG. 21 is an exemplary view illustrating a communication protocol catalog in accordance with one exemplary embodiment;

FIG. 22 is an exemplary view illustrating communication protocol information in accordance with one exemplary embodiment;

FIG. 23 is an exemplary view illustrating a communication protocol list in accordance with one exemplary embodiment;

FIG. 24 is an exemplary view illustrating types of packets in accordance with one exemplary embodiment;

DETAILED DESCRIPTION OF THE INVENTION

Figure 1:
FIG. 1 is an exemplary view conceptually illustrating a wireless power transmitter and an electronic device according to the embodiments of the present invention.

The technologies disclosed herein may be applicable to wireless power transfer (contactless power transfer). However, the technologies disclosed herein are not limited to this, and may be also applicable to all kinds of power transmission systems and methods, wireless charging circuits and methods to which the technological spirit of the technology can be applicable, in addition to the methods and apparatuses using power transmitted in a wireless manner.

It should be noted that technological terms used herein are merely used to describe a specific embodiment, but not to limit the present invention. Also, unless particularly defined otherwise, technological terms used herein should be construed as a meaning that is generally understood by those having ordinary skill in the art to which the invention pertains, and should not be construed too broadly or too narrowly. Furthermore, if technological terms used herein are wrong terms unable to correctly express the spirit of the invention, then they should be replaced by technological terms that are properly understood by those skilled in the art. In addition, general terms used in this invention should be construed based on the definition of dictionary, or the context, and should not be construed too broadly or too narrowly.

Incidentally, unless clearly used otherwise, expressions in the singular number include a plural meaning. In this application, the terms "comprising" and "including" should not be construed to necessarily include all of the elements or steps disclosed herein, and should be construed not to include some of the elements or steps thereof, or should be construed to further include additional elements or steps.

In addition, a suffix "module" or "unit" used for constituent elements disclosed in the following description is merely intended for easy description of the specification, and the suffix itself does not give any special meaning or function.

Furthermore, the terms including an ordinal number such as first, second, etc. can be used to describe various elements, but the elements should not be limited by those terms. The terms are used merely for the purpose to distinguish an element from the other element. For example, a first element may be named to a second element, and similarly, a second element may be named to a first element without departing from the scope of right of the invention.

Hereinafter, preferred embodiments of the present invention will be described in detail with reference to the accompanying drawings, and the same or similar elements are designated with the same numeral references regardless of the numerals in the drawings and their redundant description will be omitted.

In describing the present invention, moreover, the detailed description will be omitted when a specific description for publicly known technologies to which the invention pertains is judged to obscure the gist of the present invention. Also, it should be noted that the accompanying drawings are merely illustrated to easily explain the spirit of the invention, and therefore, they should not be construed to limit the spirit of the invention by the accompanying drawings.

FIG. 1—Conceptual View of Wireless Power Transmitter and Electronic Device

FIG. 1 is an exemplary view conceptually illustrating a wireless power transmitter and an electronic device according to the embodiments of the present invention.

Referring to FIG. 1, the wireless power transmitter 100 may be a power transfer apparatus configured to transfer power required for the electronic device(or wireless power receiver) 200 in a wireless manner.

Furthermore, the wireless power transmitter 100 may be a wireless charging apparatus configured to charge a battery of the electronic device(or wireless power receiver) 200 by transferring power in a wireless manner. A case where the wireless power transmitter 100 is a wireless charging apparatus will be described later with reference to FIG. 9.

Additionally, the wireless power transmitter 100 may be implemented with various forms of apparatuses transferring power to the electronic device(or wireless power receiver) 200 requiring power in a contactless state.

The electronic device(or wireless power receiver) 200 is a device that is operable by receiving power from the wireless power transmitter 100 in a wireless manner. Furthermore, the electronic device(or wireless power receiver) 200 may charge a battery using the received wireless power.

On the other hand, an electronic device for receiving power in a wireless manner as described herein should be construed broadly to include a portable phone, a cellular phone, a smart phone, a personal digital assistant (PDA), a portable multimedia player (PMP), a tablet, a multimedia device, or the like, in addition to an input/output device such as a keyboard, a mouse, an audio-visual auxiliary device, and the like.

The electronic device(or wireless power receiver) 200, as described later, may be a mobile communication terminal, (for example, a portable phone, a cellular phone, and a tablet or multimedia device). In case where the electronic device is a mobile terminal, it will be described later with reference to FIG. 10.

On the other hand, the wireless power transmitter 100 may transfer power in a wireless manner without mutual contact to the electronic device(or wireless power receiver) 200 using one or more wireless power transfer methods. In other words, the wireless power transmitter 100 may transfer power using at least one of an inductive coupling method based on magnetic induction phenomenon by the wireless power signal and a magnetic resonance coupling method based on electromagnetic resonance phenomenon by a wireless power signal at a specific frequency.

Wireless power transfer in the inductive coupling method is a technology transferring power in a wireless manner using a primary coil and a secondary coil, and refers to the transmission of power by inducing a current from a coil to another coil through a changing magnetic field by a magnetic induction phenomenon.

Wireless power transfer in the inductive coupling method refers to a technology in which the electronic device(or wireless power receiver) 200 generates resonance by a wireless power signal transmitted from the wireless power transmitter 100 to transfer power from the wireless power transmitter 100 to the wireless power receiver 200 by the resonance phenomenon.

Hereinafter, the wireless power transmitter 100 and electronic device(or wireless power receiver) 200 according to the embodiments disclosed herein will be described in detail. In assigning reference numerals to the constituent elements in each of the following drawings, the same reference numerals will be used for the same constituent elements even though they are shown in a different drawing.

Figure 2A:
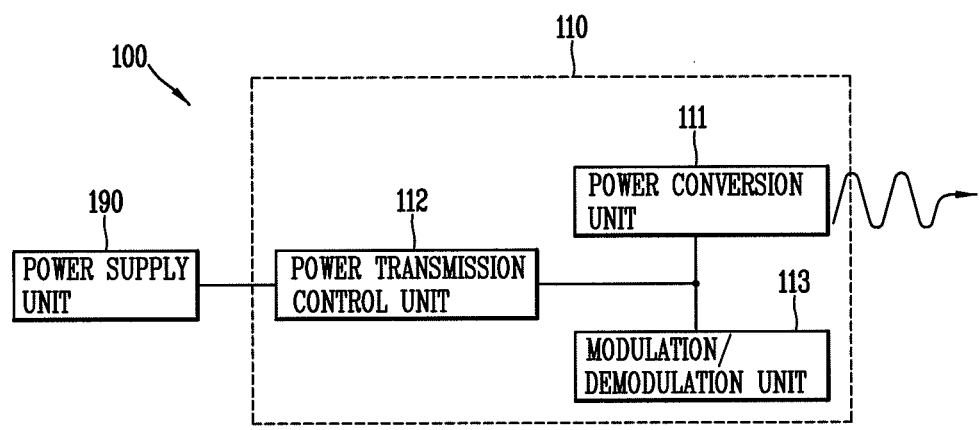
FIGS. 2A and 2B are exemplary block diagrams illustrating the configuration of a wireless power transmitter 100 and an electronic device(or wireless power receiver) 200 that can be employed in the embodiments disclosed herein, respectively.
Figure 2B:
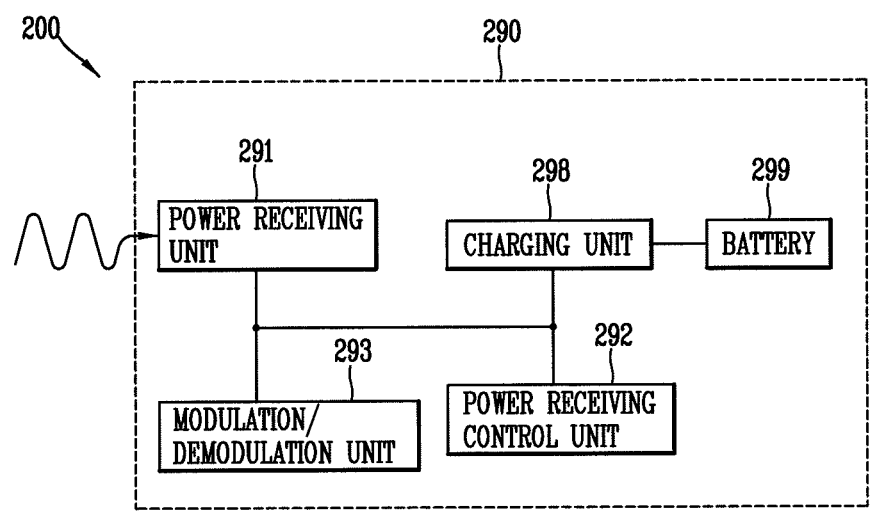

FIGS. 2A and 2B are an exemplary block diagrams illustrating the configuration of a wireless power transmitter 100 and an electronic device(or wireless power receiver) 200 that can be employed in the embodiments disclosed herein.

FIG. 2A—Wireless Power Transmitter

Referring to FIG. 2A, the wireless power transmitter 100 may include a power transmission unit 110. The power transmission unit 110 may include a power conversion unit 111 and a power transmission control unit 112.

The power conversion unit 111 transfers power supplied from a transmission side power supply unit 190 to the electronic device(or wireless power receiver) 200 by converting it into a wireless power signal. The wireless power signal transferred by the power conversion unit 111 is generated in the form of a magnetic field or electro-magnetic field having an oscillation characteristic. For this purpose, the power conversion unit 111 may be configured to include a coil for generating the wireless power signal.

The power conversion unit 111 may include a constituent element for generating a different type of wireless power signal according to each power transfer method.

In accordance with exemplary embodiments, the power conversion unit 111 may include a primary coil for forming a changing magnetic field to induce a current to a secondary coil of the electronic device(or wireless power receiver) 200. Furthermore, the power conversion unit 111 may include a coil (or antenna) for forming a magnetic field having a specific resonant frequency to generate a resonant frequency in the electronic device(or wireless power receiver) 200 according to the resonance coupling method.

Furthermore, the power conversion unit 111 may transfer power using at least one of the foregoing inductive coupling method and the resonance coupling method.

Among the constituent elements included in the power conversion unit 111, those for the inductive coupling method will be described later with reference to FIGS. 4 and 5, and those for the resonance coupling method will be described with reference to FIGS. 7 and 8.

On the other hand, the power conversion unit 111 may further include a circuit for controlling the characteristics of a used frequency, an applied voltage, an applied current or the like to form the wireless power signal.

The power transmission control unit 112 controls each of the constituent elements included in the power transmission unit 110 The power transmission control unit 112 may be implemented to be integrated into another control unit (not shown) for controlling the wireless power transmitter 100.

On the other hand, a region to which the wireless power signal can be approached may be divided into two types. First, an active area denotes a region through which a wireless power signal transferring power to the electronic device(or wireless power receiver) 200 is passed. Next, a semi-active area denotes an interest region in which the wireless power transmitter 100 can detect the existence of the electronic device(or wireless power receiver) 200. Here, the power transmission control unit 112 may detect whether the electronic device(or wireless power receiver) 200 is placed in the active area or detection area or removed from the area. Specifically, the power transmission control unit 112 may detect whether or not the electronic device(or wireless power receiver) 200 is placed in the active area or detection area using a wireless power signal formed from the power conversion unit 111 or a sensor separately provided therein. For instance, the power transmission control unit 112 may detect the presence of the electronic device(or wireless power receiver) 200 by monitoring whether or not the characteristic of power for forming the wireless power signal is changed by the wireless power signal, which is affected by the electronic device(or wireless power receiver) 200 existing in the detection area. However, the active area and detection area may vary according to the wireless power transfer method such as an inductive coupling method, a resonance coupling method, and the like.

The power transmission control unit 112 may perform the process of identifying the electronic device(or wireless power receiver) 200 or determine whether to start wireless power transfer according to a result of detecting the existence of the electronic device(or wireless power receiver) 200.

Furthermore, the power transmission control unit 112 may determine at least one characteristic of a frequency, a voltage, and a current of the power conversion unit 111 for forming the wireless power signal. The determination of the characteristic may be carried out by a condition at the side of the wireless power transmitter 100 or a condition at the side of the electronic device(or wireless power receiver) 200. In exemplary embodiments, the power transmission control unit 112 may decide the characteristic based on device identification information. In another exemplary embodiment, the power transmission control unit 112 may decide the characteristic based on required power information of the electronic device(or wireless power receiver) 200 or profile information related to the required power. The power transmission control unit 112 may receive a power control message from the electronic device(or wireless power receiver) 200. The power transmission control unit 112 may determine at least one characteristic of a frequency, a voltage and a current of the power conversion unit 111 based on the received power control message, and additionally perform other control operations based on the power control message.

For example, the power transmission control unit 112 may determine at least one characteristic of a frequency, a voltage and a current used to form the wireless power signal according to the power control message including at least one of rectified power amount information, charging state information and identification information in the electronic device(or wireless power receiver) 200.

Furthermore, as another control operation using the power control message, the wireless power transmitter 100 may perform a typical control operation associated with wireless power transfer based on the power control message. For example, the wireless power transmitter 100 may receive information associated with the electronic device(or wireless power receiver) 200 to be auditorily or visually outputted through the power control message, or receive information required for authentication between devices.

In exemplary embodiments, the power transmission control unit 112 may receive the power control message through the wireless power signal. In other exemplary embodiment, the power transmission control unit 112 may receive the power control message through a method for receiving user data.

In order to receive the foregoing power control message, the wireless power transmitter 100 may further include a modulation/demodulation unit 113 electrically connected to the power conversion unit 111. The modulation/demodulation unit 113 may modulate a wireless power signal that has been modulated by the electronic device(or wireless power receiver) 200 and use it to receive the power control message. The method for allowing the power conversion unit 111 to receive a power control message using a wireless power signal will be described later with reference to FIGS. 11 through 13.

In addition, the power transmission control unit 112 may acquire a power control message by receiving user data including a power control message by a communication means (not shown) included in the wireless power transmitter 100.

In accordance with one exemplary embodiment, the wireless power transmitter 100 may supply power to a plurality of electronic devices. Here, collision may occur between wireless power signal which have been modulated by the plurality of electronic devices. Hence, the constituent elements included in the wireless power transmitter 100 may perform various operations to avoid such collision between the modulated wireless power signal.

In one exemplary embodiment, the power conversion unit 111 may convert power supplied from the transmission side power supply unit 190 into a wireless power signal and transfer it to the plurality of electronic devices. For example, the plurality of electronic devices may be two electronic devices, namely, a first electronic device and a second electronic device.

The power conversion unit 111 may generate a wireless power signal for power transmission, and receive a first response signal and a second response signal corresponding to the wireless power signal.

The power transmission control unit 112 may determine whether or not the first and second response signals collide with each other. When the first and second response signals collide with each other according to the determination result, the power transmission control unit 112 may reset the power transmission.

The first and second response signals may be generated by modulating the wireless power signal through the first and second electronic devices.

Through the resetting of the power transmission, the power transmission control unit 112 may control the power conversion unit 111 to sequentially receive the first and second response signals, which are generated to avoid collision with each other.

The sequential reception indicates that the first response signal is received after a first time interval and the second response signal is received after a second time interval within a predetermined response period. The first and second time intervals may be decided based on a value obtained by generating a random number.

The predetermined response period (Tping interval) may be decided to be long enough to include both the first response signal and the second response signal. Also, it may be decided after resetting the power transmission.

In accordance with one exemplary embodiment, occurrence or non-occurrence of the collision may be determined according to whether or not the first and second response signals are decoded using a preset format. The preset format may include a preamble, a header and a message. Whether or not the first and second response signals collide with each other may be determined based on whether or not the first and second response signals are not recoverable due to an error generation in at least one of the preamble, the header and the message caused by the collision.

In accordance with one exemplary embodiment, the power conversion unit 111 may periodically receive a response signal of the first device, which does not collide with a response signal of the second device within a first response period (Tping interval_1). The power transmission control unit may decode the first response signal and the second response signal using a preset format, and determine whether or not the first and second response signals have collided with each other based on whether or not the decoding is performed. Here, the first response signal and the second response signal may be periodically received within a second response period (Tping interval_2). The second response period (Tping interval_2) may be decided long enough to include both the first and second response signals, and be decided after resetting the power transmission.

FIG. 2B—Electronic Device

Referring to FIG. 2B, the electronic device(or wireless power receiver) 200 may include a power supply unit 290. The power supply unit 290 supplies power required for the operation of the electronic device(or wireless power receiver) 200. The power supply unit 290 may include a power receiving unit 291 and a Power reception control unit(or POWER RECEIVING CONTROL UNIT) 292.

The power receiving unit 291 receives power transferred from the wireless power transmitter 100 in a wireless manner.

The power receiving unit 291 may include constituent elements required to receive the wireless power signal according to a wireless power transfer method. Furthermore, the power receiving unit 291 may receive power according to at least one wireless power transfer method, and in this case, the power receiving unit 291 may include constituent elements required for each method.

First, the power receiving unit 291 may include a coil for receiving a wireless power signal transferred in the form of a magnetic field or electromagnetic field having a vibration characteristic.

For instance, as a constituent element according to the inductive coupling method, the power receiving unit 291 may include a secondary coil to which a current is induced by a changing magnetic field. In exemplary embodiments, the power receiving unit 291, as a constituent element according to the resonance coupling method, may include a coil and a resonant circuit in which resonance phenomenon is generated by a magnetic field having a specific resonant frequency.

In another exemplary embodiments, when the power receiving unit 291 receives power according to at least one wireless power transfer method, the power receiving unit 291 may be implemented to receive power by using a coil, or implemented to receive power by using a coil formed differently according to each power transfer method.

Among the constituent elements included in the power receiving unit 291, those for the inductive coupling method will be described later with reference to FIGS. 4A and 4B, and those for the resonance coupling method with reference to FIGS. 7A and 7B.

On the other hand, the power receiving unit 291 may further include a rectifier and a regulator to convert the wireless power signal into a direct current. Furthermore, the power receiving unit 291 may further include a circuit for protecting an overvoltage or overcurrent from being generated by the received power signal.

The Power reception control unit(or POWER RECEIVING CONTROL UNIT) 292 may control each constituent element included in the power supply unit 290.

Specifically, the Power reception control unit(or POWER RECEIVING CONTROL UNIT) 292 may transfer a power control message to the wireless power transmitter 100. The power control message may instruct the wireless power transmitter 100 to initiate or terminate a transfer of the wireless power signal. Furthermore, the power control message may instruct the wireless power transmitter 100 to control a characteristic of the wireless power signal.

In exemplary embodiments, the Power reception control unit(or POWER RECEIVING CONTROL UNIT) 292 may transmit the power control message through the wireless power signal. In another exemplary embodiment, the Power reception control unit(or POWER RECEIVING CONTROL UNIT) 292 may transmit the power control message through a method for transmitting user data.

In order to transmit the foregoing power control message, the electronic device(or wireless power receiver) 200 may further include a modulation/demodulation unit 293 electrically connected to the power receiving unit 291. The modulation/demodulation unit 293, similarly to the case of the wireless power transmitter 100, may be used to transmit the power control message through the wireless power signal. The power communications modulation/demodulation unit 293 may be used as a means for controlling a current and/or voltage flowing through the power conversion unit 111 of the wireless power transmitter 100. Hereinafter, a method for allowing the power communications modulation/demodulation unit 113 or 293 at the side of the wireless power transmitter 100 and at the side of the electronic device(or wireless power receiver) 200, respectively, to be used to transmit and receive a power control message through a wireless power signal will be described.

A wireless power signal formed by the power conversion unit 111 is received by the power receiving unit 291. At this time, the Power reception control unit(or POWER RECEIVING CONTROL UNIT) 292 controls the power communications modulation/demodulation unit 293 at the side of the electronic device(or wireless power receiver) 200 to modulate the wireless power signal. For instance, the Power reception control unit(or POWER RECEIVING CONTROL UNIT) 292 may perform a modulation process such that a power amount received from the wireless power signal is varied by changing a reactance of the power communications modulation/demodulation unit 293 connected to the power receiving unit 291. The change of a power amount received from the wireless power signal results in the change of a current and/or voltage of the power conversion unit 111 for forming the wireless power signal. At this time, the modulation/demodulation unit 113 at the side of the wireless power transmitter 100 may detect a change of the current and/or voltage to perform a demodulation process.

In other words, the Power reception control unit(or POWER RECEIVING CONTROL UNIT) 292 may generate a packet including a power control message intended to be transferred to the wireless power transmitter 100 and modulate the wireless power signal to allow the packet to be included therein, and the power transmission control unit 112 may decode the packet based on a result of performing the demodulation process of the power communications modulation/demodulation unit 113 to acquire the power control message included in the packet. The detailed method of allowing the wireless power transmitter 100 to acquire the power control message will be described later with reference to FIGS. 11 through 13.

In addition, the Power reception control unit(or POWER RECEIVING CONTROL UNIT) 292 may transmit a power control message to the wireless power transmitter 100 by transmitting user data including the power control message by a communication means (not shown) included in the electronic device(or wireless power receiver) 200.

In addition, the power supply unit 290 may further include a charger(or charging unit) 298 and a battery 299.

The electronic device(or wireless power receiver) 200 receiving power for operation from the power supply unit 290 may be operated by power transferred from the wireless power transmitter 100, or operated by charging the battery 299 using the transferred power and then receiving the charged power. At this time, the Power reception control unit(or POWER RECEIVING CONTROL UNIT) 292 may control the charger(or charging unit) 298 to perform charging using the transferred power.

In one exemplary embodiment, the plurality of electronic devices may receive power from the wireless power transmitter 100. Here, collision may occur between wireless power signal which have been modulated by the plurality of electronic devices. Hence, the constituent elements included in the wireless power transmitter 100 may perform various operations to avoid such collision between the modulated wireless power signal.

In one exemplary embodiment, the power receiving unit 291 may receive the wireless power signal for the power transmission from the wireless power transmitter.

Here, the Power reception control unit(or POWER RECEIVING CONTROL UNIT) 292 may control the power receiving unit 291 to transmit a third response signal corresponding to the wireless power signal after a time interval set to a first time within the first response period (Tping interval_1).

In one exemplary embodiment, the Power reception control unit(or POWER RECEIVING CONTROL UNIT) 292 may determine whether or not the power transmission of the wireless power transmitter 100 has been reset due to collision between the modulated wireless power signal, and set the time interval to a second time when the power transmission has been reset according to the determination result.

In one exemplary embodiment, the Power reception control unit(or POWER RECEIVING CONTROL UNIT) 292 may control the power receiving unit 291 to transmit a fourth response signal corresponding to the wireless power signal after the time interval set to the second time within the second response period (Tping interval_2). The second time may be decided by a value obtained by generating a random number. Hereinafter, a wireless power transmitter and an electronic device applicable to the embodiments disclosed herein will be described.

First, a method of allowing the wireless power transmitter to transfer power to the electronic device according to the inductive coupling method will be described with reference to FIGS. 3 through 5.

Figure 3:
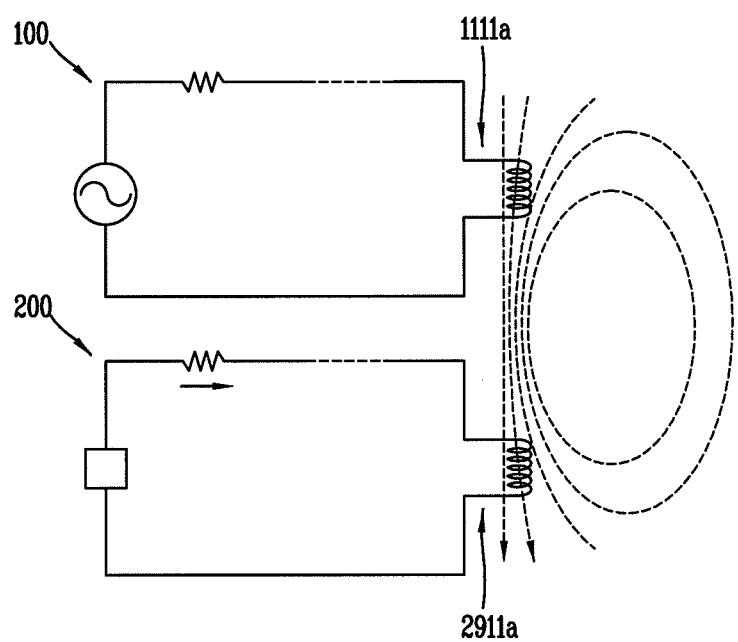
FIG. 3 is a view illustrating a concept in which power is transferred from a wireless power transmitter to an electronic device in a wireless manner according to an inductive coupling method.

FIG. 3—Inductive Coupling Method

FIG. 3 is a view illustrating a concept in which power is transferred from a wireless power transmitter to an electronic device in a wireless manner according to an inductive coupling method.

When the power of the wireless power transmitter 100 is transferred in an inductive coupling method, if the strength of a current flowing through a primary coil within the power transmission unit 110 is changed, then a magnetic field passing through the primary coil will be changed by the current. The changed magnetic field generates an induced electromotive force at a secondary coil in the electronic device(or wireless power receiver) 200.

According to the foregoing method, the power conversion unit 111 of the wireless power transmitter 100 may include a transmitting(Tx) coil 1111a being operated as a primary coil in magnetic induction. Furthermore, the power receiving unit 291 of the electronic device(or wireless power receiver) 200 may include a receiving (Rx) coil 2911a being operated as a secondary coil in magnetic induction.

First, the wireless power transmitter 100 and electronic device(or wireless power receiver) 200 are disposed in such a manner that the transmitting(Tx) coil 1111a at the side of the wireless power transmitter 100 and the receiving coil at the side of the electronic device(or wireless power receiver) 200 are located adjacent to each other. Then, if the power transmission control unit 112 controls a current of the transmitting(Tx) coil 1111a to be changed, then the power receiving unit 291 controls power to be supplied to the electronic device(or wireless power receiver) 200 using an electromotive force induced to the receiving(Rx) coil 2911a.

The efficiency of wireless power transfer by the inductive coupling method may be little affected by a frequency characteristic, but affected by an alignment and distance between the wireless power transmitter 100 and the electronic device(or wireless power receiver) 200 including each coil.

On the other hand, in order to perform wireless power transfer in the inductive coupling method, the wireless power transmitter 100 may be configured to include an interface surface (not shown) in the form of a flat surface. One or more electronic devices may be placed at an upper portion of the interface surface, and the transmitting(Tx) coil 1111a may be mounted at a lower portion of the interface surface. In this case, a vertical spacing is formed in a small-scale between the transmitting(Tx) coil 1111a mounted at a lower portion of the interface surface and the receiving(Rx) coil 2911a of the electronic device(or wireless power receiver) 200 placed at an upper portion of the interface surface, and thus a distance between the coils becomes sufficiently small to efficiently implement contactless power transfer by the inductive coupling method.

Furthermore, an alignment indicator (not shown) indicating a location where the electronic device(or wireless power receiver) 200 is to be placed at an upper portion of the interface surface. The alignment indicator indicates a location of the electronic device(or wireless power receiver) 200 where an alignment between the transmitting(Tx) coil 1111a mounted at a lower portion of the interface surface and the receiving(Rx) coil 2911a can be suitably implemented. The alignment indicator may alternatively be simple marks, or may be formed in the form of a protrusion structure for guiding the location of the electronic device(or wireless power receiver) 200. Otherwise, the alignment indicator may be formed in the form of a magnetic body such as a magnet mounted at a lower portion of the interface surface, thereby guiding the coils to be suitably arranged by mutual magnetism to a magnetic body having an opposite polarity mounted within the electronic device(or wireless power receiver) 200.

On the other hand, the wireless power transmitter 100 may be formed to include one or more transmitting coils. The wireless power transmitter 100 may selectively use some of coils suitably arranged with the receiving(Rx) coil 2911a of the electronic device(or wireless power receiver) 200 among the one or more transmitting coils to enhance the power transmission efficiency. The wireless power transmitter 100 including the one or more transmitting coils will be described later with reference to FIG. 5.

Hereinafter, a configuration of the wireless power transmitter and electronic device using an inductive coupling method applicable to the embodiments disclosed herein will be described in detail.

Figure 4A:
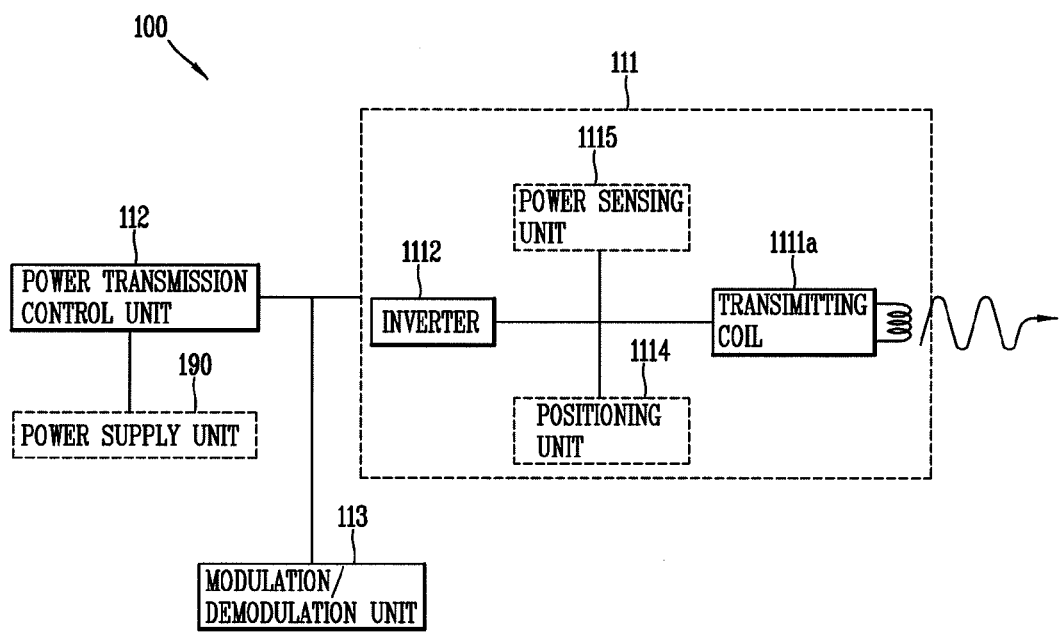
FIGS. 4A and 4B are a block diagram illustrating part of the wireless power transmitter 100 and electronic device(or wireless power receiver) 200 in a magnetic induction method that can be employed in the embodiments disclosed herein.
Figure 4B:
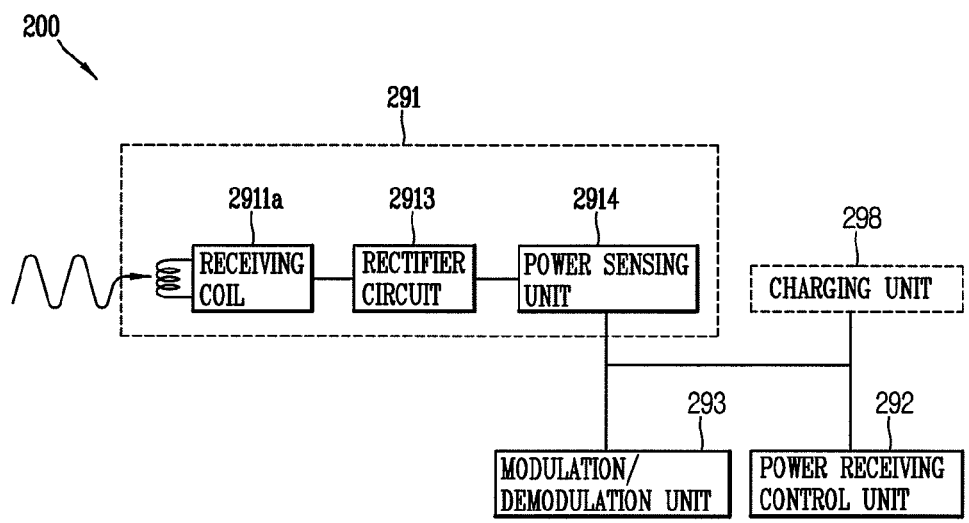

FIGS. 4A and 4B—Wireless Power Transmitter and Electronic Device in Inductive Coupling Method FIGS. 4A and 4B are a block diagram illustrating part of the wireless power transmitter 100 and electronic device(or wireless power receiver) 200 in a magnetic induction method that can be employed in the embodiments disclosed herein. A configuration of the power transmission unit 110 included in the wireless power transmitter 100 will be described with reference to FIG. 4A, and a configuration of the power supply unit 290 included in the electronic device (or wireless power receiver) 200 will be described with reference to FIG. 4B.

Referring to FIG. 4A, the power conversion unit 111 of the wireless power transmitter 100 may include a transmitting(Tx) coil 1111a and an inverter 1112.

The transmitting(Tx) coil 1111a may form a magnetic field corresponding to the wireless power signal according to a change of current as described above. The transmitting(Tx) coil 1111a may alternatively be implemented with a planar spiral type or cylindrical solenoid type.

The inverter 1112 transforms a DC input obtained from the power supply unit 190 into an AC waveform. The AC current transformed by the inverter 1112 drives a resonant circuit including the transmitting(Tx) coil 1111*a* and a capacitor (not shown) to form a magnetic field in the transmitting(Tx) coil 1111*a*.

In addition, the power conversion unit 111 may further include a positioning unit 1114.

The positioning unit 1114 may move or rotate the transmitting(Tx) coil 1111*a* to enhance the effectiveness of contactless power transfer using the inductive coupling method. As described above, it is because an alignment and distance between the wireless power transmitter 100 and the electronic device(or wireless power receiver) 200 including a primary coil and a secondary coil may affect power transfer using the inductive coupling method. In particular, the positioning unit 1114 may be used when the electronic device(or wireless power receiver) 200 does not exist within an active area of the wireless power transmitter 100.

Accordingly, the positioning unit 1114 may include a drive unit (not shown) for moving the transmitting(Tx) coil 1111*a* such that a center-to-center distance of the transmitting(Tx) coil 1111*a* of the wireless power transmitter 100 and the receiving(Rx) coil 2911*a* of the electronic device(or wireless power receiver) 200 is within a predetermined range, or rotating the transmitting(Tx) coil 1111*a* such that the centers of the transmitting(Tx) coil 1111*a* and the receiving(Rx) coil 2911*a* are overlapped with each other.

For this purpose, the wireless power transmitter 100 may further include a detection unit (not shown) made of a sensor for detecting the location of the electronic device(or wireless power receiver) 200, and the power transmission control unit 112 may control the positioning unit 1114 based on the location information of the electronic device(or wireless power receiver) 200 received from the location detection sensor.

Furthermore, to this end, the power transmission control unit 112 may receive control information on an alignment or distance to the electronic device(or wireless power receiver) 200 through the power communications modulation/demodulation unit 113, and control the positioning unit 1114 based on the received control information on the alignment or distance.

If the power conversion unit 111 is configured to include a plurality of transmitting coils, then the positioning unit 1114 may determine which one of the plurality of transmitting coils is to be used for power transmission. The configuration of the wireless power transmitter 100 including the plurality of transmitting coils will be described later with reference to FIG. 5.

On the other hand, the power conversion unit 111 may further include a power sensing unit 1115. The power sensing unit 1115 at the side of the wireless power transmitter 100 monitors a current or voltage flowing into the transmitting(Tx) coil 1111*a*. The power sensing unit 1115 is provided to check whether or not the wireless power transmitter 100 is normally operated, and thus the power sensing unit 1115 may detect a voltage or current of the power supplied from the outside, and check whether the detected voltage or current exceeds a threshold value. The power sensing unit 1115, although not shown, may include a resistor for detecting a voltage or current of the power supplied from the outside and a comparator for comparing a voltage value or current value of the detected power with a threshold value to output the comparison result. Based on the check result of the power sensing unit 1115, the power transmission control unit 112 may control a switching unit (not shown) to cut off power applied to the transmitting(Tx) coil 1111*a*.

Referring to FIG. 4B, the power supply unit 290 of the electronic device(or wireless power receiver) 200 may include a receiving (Rx) coil 2911*a* and a rectifier(or rectifying) circuit 2913.

A current is induced into the receiving(Rx) coil 2911*a* by a change of the magnetic field formed in the transmitting (Tx) coil 1111*a*. The implementation type of the receiving (Rx) coil 2911*a* may be a planar spiral type or cylindrical solenoid type similarly to the transmitting(Tx) coil 1111*a*.

Furthermore, series and parallel capacitors may be configured to be connected to the receiving(Rx) coil 2911*a* to enhance the effectiveness of wireless power reception or perform resonant detection.

The receiving(Rx) coil 2911*a* may be in the form of a single coil or a plurality of coils.

The rectifier(or rectifying) circuit 2913 performs a full-wave rectification to a current to convert alternating current into direct current. The rectifier(or rectifying) circuit 2913, for instance, may be implemented with a full-bridge rectifier generation circuit made of four diodes or a circuit using active components.

In addition, the rectifier(or rectifying) circuit 2913 may further include a regulator circuit for converting a rectified current into a more flat and stable direct current. Furthermore, the output power of the rectifier(or rectifying) circuit 2913 is supplied to each constituent element of the power supply unit 290. Furthermore, the rectifier(or rectifying) circuit 2913 may further include a DC-DC converter for converting output DC power into a suitable voltage to adjust it to the power required for each constituent element (for instance, a circuit such as a charger(or charging unit) 298).

The power communications modulation/demodulation unit 293 may be connected to the power receiving unit 291, and may be configured with a resistive element in which resistance varies with respect to direct current, and may be configured with a capacitive element in which reactance varies with respect to alternating current. The Power reception control unit(or POWER RECEIVING CONTROL UNIT) 292 may change the resistance or reactance of the power communications modulation/demodulation unit 293 to modulate a wireless power signal received to the power receiving unit 291.

On the other hand, the power supply unit 290 may further include a power sensing unit 2914. The power sensing unit 2914 at the side of the electronic device(or wireless power receiver) 200 monitors a voltage and/or current of the power rectified by the rectifier(or rectifying) circuit 2913, and if the voltage and/or current of the rectified power exceeds a threshold value as a result of monitoring, then the Power reception control unit(or POWER RECEIVING CONTROL UNIT) 292 transmits a power control message to the wireless power transmitter 100 to transfer suitable power.

Figure 5:
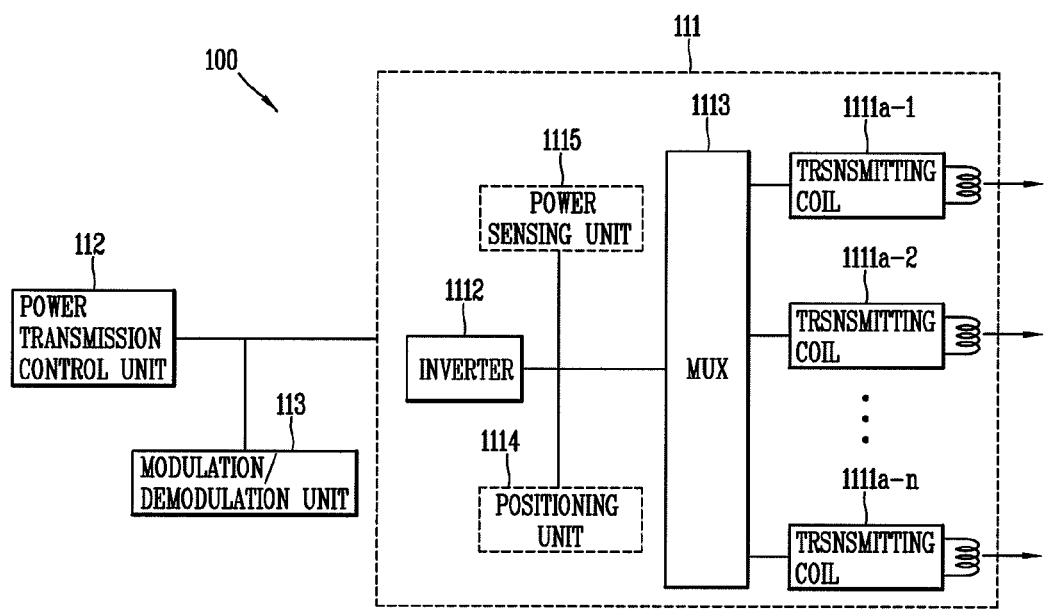
FIG. 5 is a block diagram illustrating a wireless power transmitter configured to have one or more transmission coils receiving power according to an inductive coupling method that can be employed in the embodiments disclosed herein.

FIG. 5—Wireless Power Transmitter Configured to Include One or More Transmitting Coils FIG. 5 is a block diagram illustrating a wireless power transmitter configured to have one or more transmission coils receiving power according to an inductive coupling method that can be employed in the embodiments disclosed herein.

Referring to FIG. 5, the power conversion unit 111 of the wireless power transmitter 100 according to the embodiments disclosed herein may include one or more transmitting coils 1111*a*-1 to 1111*a*-*n*. The one or more transmitting coils 1111*a*-1 to 1111*a*-*n* may be an array of partly overlapping primary coils. An active area may be determined by some of the one or more transmitting coils.

The one or more transmitting coils 1111a-1 to 1111a-n may be mounted at a lower portion of the interface surface. Furthermore, the power conversion unit 111 may further include a multiplexer 1113 for establishing and releasing the connection of some of the one or more transmitting coils 1111a-1 to 1111a-n.

Upon detecting the location of the electronic device(or wireless power receiver) 200 placed at an upper portion of the interface surface, the power transmission control unit 112 may take the detected location of the electronic device (or wireless power receiver) 200 into consideration to control the multiplexer 1113, thereby allowing coils that can be placed in an inductive coupling relation to the receiving(Rx) coil 2911a of the electronic device(or wireless power receiver) 200 among the one or more transmitting coils 1111a-1 to 1111a-n to be connected to one another.

For this purpose, the power transmission control unit 112 may acquire the location information of the electronic device(or wireless power receiver) 200. For example, the power transmission control unit 112 may acquire the location of the electronic device(or wireless power receiver) 200 on the interface surface by the location detection unit (not shown) provided in the wireless power transmitter 100. For another example, the power transmission control unit 112 may alternatively receive a power control message indicating a strength of the wireless power signal from an object on the interface surface or a power control message indicating the identification information of the object using the one or more transmitting coils 1111a-1 to 1111a-n, respectively, and determines whether it is located adjacent to which one of the one or more transmitting coils based on the received result, thereby acquiring the location information of the electronic device(or wireless power receiver) 200.

On the other hand, the active area as part of the interface surface may denote a portion through which a magnetic field with a high efficiency can pass when the wireless power transmitter 100 transfers power to the electronic device(or wireless power receiver) 200 in a wireless manner. At this time, a single transmitting coil or one or a combination of more transmitting coils forming a magnetic field passing through the active area may be designated as a primary cell. Accordingly, the power transmission control unit 112 may determine an active area based on the detected location of the electronic device(or wireless power receiver) 200, and establish the connection of a primary cell corresponding to the active area to control the multiplexer 1113, thereby allowing the receiving (Rx) coil 2911a of the electronic device(or wireless power receiver) 200 and the coils belonging to the primary cell to be placed in an inductive coupling relation.

In the meantime, upon disposing one or more electronic devices 200 on an interface surface of the wireless power transmitter 100, which includes the one or more transmitting coils 1111a-1 to 1111a-n, the power transmission control unit 112 may control the multiplexer 1113 to allow the coils belonging to the primary cell corresponding to the position of each electronic device to be placed in the inductive coupling relation. Accordingly, the wireless power transmitter 100 may generate the wireless power signal using different coils, thereby transferring it to the one or more electronic devices in a wireless manner.

Also, the power transmission control unit 112 may set power having a different characteristic to be supplied to each of the coils corresponding to the electronic devices. Here, the wireless power transmitter 100 may transfer power by differently setting a power transfer scheme, efficiency, characteristic and the like for each electronic device. The power transmission for one or more electronic devices will be described later with reference to FIG. 28.

Furthermore, the power conversion unit 111 may further include an impedance matching unit (not shown) for controlling an impedance to form a resonant circuit with the coils connected thereto.

Hereinafter, a method for allowing a wireless power transmitter to transfer power according to a resonance coupling method will be disclosed with reference to FIGS. 6 through 8.

Figure 6:
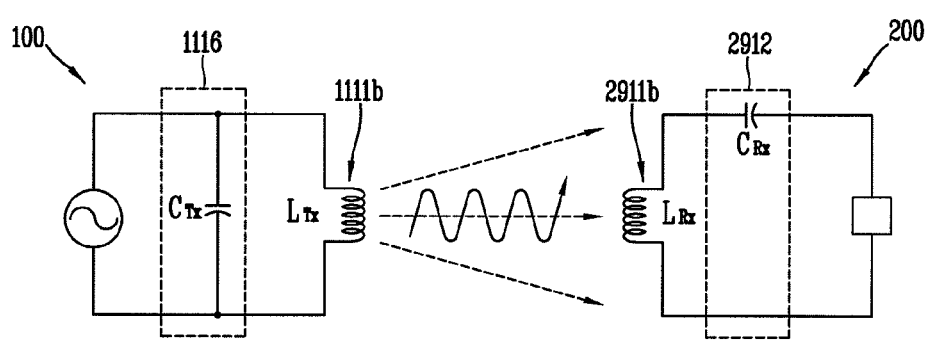
FIG. 6 is a view illustrating a concept in which power is transferred to an electronic device from a wireless power transmitter in a wireless manner according to a resonance coupling method.

FIG. 6—Resonance Coupling Method

FIG. 6 is a view illustrating a concept in which power is transferred to an electronic device from a wireless power transmitter in a wireless manner according to an resonance coupling method.

First, resonance will be described in brief as follows. Resonance refers to a phenomenon in which an amplitude of vibration is remarkably increased when periodically receiving an external force having the same frequency as the natural frequency of a vibration system. Resonance is a phenomenon occurring at all kinds of vibrations such as mechanical vibration, electric vibration, and the like. Generally, when exerting a vibratory force to a vibration system from the outside, if the natural frequency thereof is the same as a frequency of the externally applied force, then the vibration becomes strong, thus increasing the width.

With the same principle, when a plurality of vibrating bodies separated from one another within a predetermined distance vibrate at the same frequency, the plurality of vibrating bodies resonate with one another, and in this case, resulting in a reduced resistance between the plurality of vibrating bodies. In an electrical circuit, a resonant circuit can be made by using an inductor and a capacitor.

When the wireless power transmitter 100 transfers power according to the inductive coupling method, a magnetic field having a specific vibration frequency is formed by alternating current power in the power transmission unit 110. If a resonance phenomenon occurs in the electronic device(or wireless power receiver) 200 by the formed magnetic field, then power is generated by the resonance phenomenon in the electronic device(or wireless power receiver) 200.

Describing a principle of the resonance coupling, in general, a method for transferring power by generating an electromagnetic wave exhibits low power transmission efficiency, and may badly affect human bodies due to radiation of the electromagnetic waves and exposure to the electromagnetic waves.

However, if the plurality of vibrating bodies resonate with each other in an electromagnetic manner as aforementioned, extremely high power transmission efficiency may be exhibited due to non affection by adjacent objects except for the vibrating bodies. An energy tunnel may be generated between the plurality of vibrating bodies which resonate with each other in the electromagnetic manner. This may be referred to as energy coupling or energy tail.

The resonance coupling disclosed herein may use an electromagnetic wave having a low frequency. When power is transferred using the electromagnetic wave having the low frequency, only a magnetic field may affect an area located within a single wavelength of the electromagnetic wave. The magnetic resonance may be generated when the wireless power transmitter 100 and the electronic device(or wireless power receiver) 200 are located within the single wavelength of the electromagnetic wave having the low frequency.

Here, in general, human bodies are sensitive to an electric field but tolerant to a magnetic field. Hence, when power is transferred using a magnetic resonance, the human bodies may be badly affected due to being exposed to the electromagnetic wave. Also, as the energy tail is generated in response to the resonance phenomenon, the form of power transmission may exhibit a non-radiative property. Consequently, upon transferring power using such electromagnetic wave, a radiative problem which occurs frequently may be solved.

The resonance coupling method may be a method for transferring power using the electromagnetic wave with the low frequency, as aforementioned. Thus, the transmitting (Tx) coil 1111b of the wireless power transmitter 100 may form a magnetic field or electromagnetic wave for transferring power in principle. However, the resonance coupling method will be described hereinafter from the perspective of a magnetic resonance, namely, a power transmission by a magnetic field.

The resonant frequency may be determined by the following formula in Equation 1.

$$f=1/2\pi\sqrt{LC} \quad \text{[Equation 1]}$$

Here, the resonant frequency (f) is determined by an inductance (L) and a capacitance (C) in a circuit. In a circuit forming a magnetic field using a coil, the inductance can be determined by a number of turns of the coil, and the like, and the capacitance can be determined by a gap between the coils, an area, and the like. In addition to the coil, a capacitive resonant circuit may be configured to be connected thereto to determine the resonant frequency.

Referring to FIG. 6, when power is transmitted in a wireless manner according to the resonance coupling method, the power conversion unit 111 of the wireless power transmitter 100 may include a transmitting(Tx) coil 1111b in which a magnetic field is formed and a resonant circuit(or RESONANT GENERATION CIRCUIT) 1116 connected to the transmitting(Tx) coil 1111b to determine a specific vibration frequency. The resonant circuit(or RESONANT GENERATION CIRCUIT) 1116 may be implemented by using a capacitive circuit (capacitors), and the specific vibration frequency may be determined based on an inductance of the transmitting(Tx) coil 1111b and a capacitance of the resonant circuit(or RESONANT GENERATION CIRCUIT) 1116.

The configuration of a circuit element of the resonant circuit(or RESONANT GENERATION CIRCUIT) 1116 may be implemented in various forms such that the power conversion unit 111 forms a magnetic field, and is not limited to a form of being connected in parallel to the transmitting(Tx) coil 1111b as illustrated in FIG. 6.

Furthermore, the power receiving unit 291 of the electronic device(or wireless power receiver) 200 may include a resonant circuit(or RESONANT GENERATION CIRCUIT) 2912 and a receiving (Rx) coil 2911b to generate a resonance phenomenon by a magnetic field formed in the wireless power transmitter 100. In other words, the resonant circuit (or RESONANT GENERATION CIRCUIT) 2912 may be also implemented by using a capacitive circuit, and the resonant circuit(or RESONANT GENERATION CIRCUIT) 2912 is configured such that a resonant frequency determined based on an inductance of the receiving coil 2911b and a capacitance of the resonant circuit(or RESONANT GENERATION CIRCUIT) 2912 has the same frequency as a resonant frequency of the formed magnetic field.

The configuration of a circuit element of the resonant circuit(or RESONANT GENERATION CIRCUIT) 2912 may be implemented in various forms such that the power receiving unit 291 generates resonance by a magnetic field, and is not limited to a form of being connected in series to the receiving coil 2911b as illustrated in FIG. 6.

The specific vibration frequency in the wireless power transmitter 100 may have $L_{TX}$, $C_{TX}$, and may be acquired by using the Equation 1. Here, the electronic device(or wireless power receiver) 200 generates resonance when a result of substituting the $L_{RX}$ and $C_{RX}$ of the electronic device(or wireless power receiver) 200 to the Equation 1 is same as the specific vibration frequency.

According to a contactless power transfer method by resonance coupling, when the wireless power transmitter 100 and electronic device(or wireless power receiver) 200 resonate at the same frequency, respectively, an electromagnetic wave is propagated through a short-range magnetic field, and thus there exists no energy transfer between the devices if they have different frequencies.

As a result, an efficiency of contactless power transfer by the resonance coupling method is greatly affected by a frequency characteristic, whereas the effect of an alignment and distance between the wireless power transmitter 100 and the electronic device(or wireless power receiver) 200 including each coil is relatively smaller than the inductive coupling method.

Hereinafter, the configuration of a wireless power transmitter and an electronic device in the resonance coupling method applicable to the embodiments disclosed herein will be described in detail.

Figure 7A:
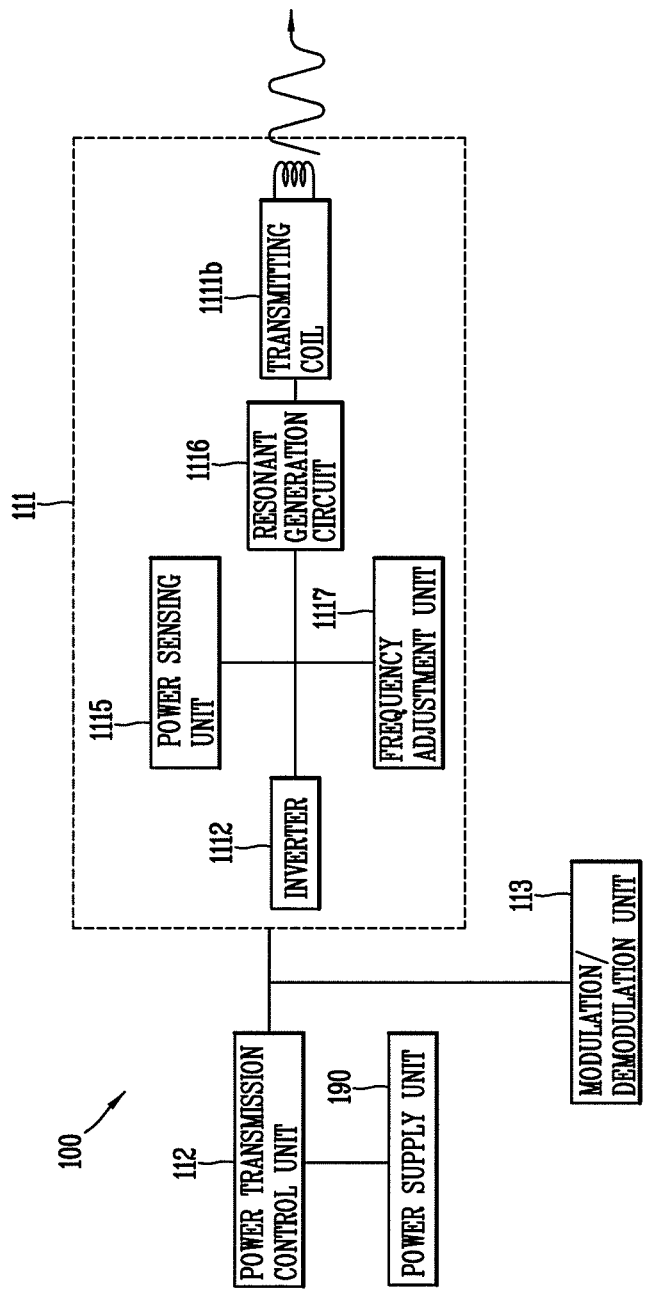
FIGS. 7A and 7B are a block diagram illustrating part of the wireless power transmitter 100 and electronic device(or wireless power receiver) 200 in a resonance method that can be employed in the embodiments disclosed herein.
Figure 7B:
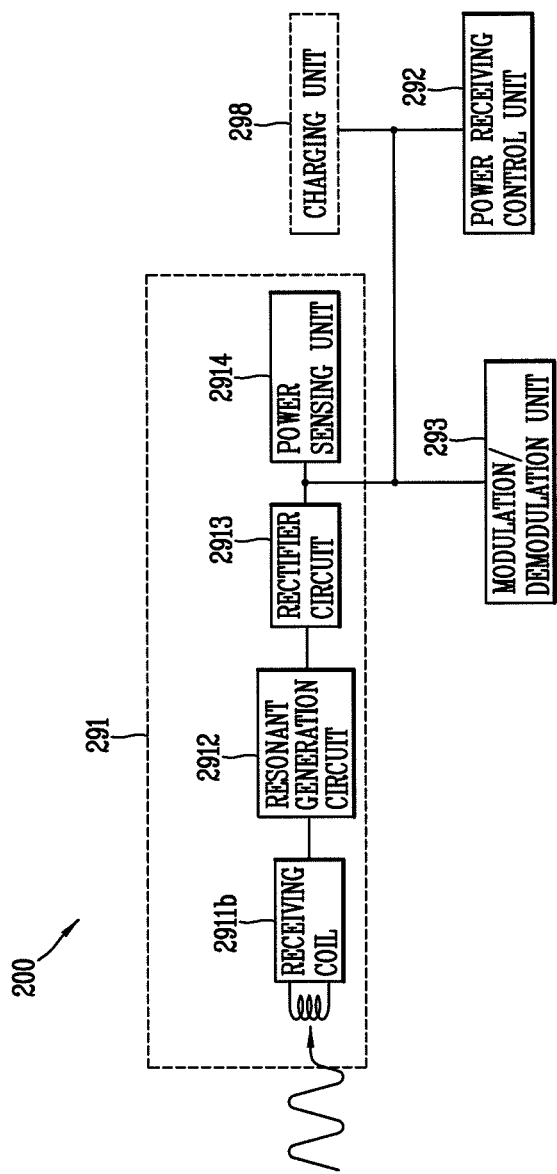

FIGS. 7A and 7B—Wireless Power Transmitter in Resonance Coupling Method

FIGS. 7A and 7B is a block diagram illustrating part of the wireless power transmitter 100 and electronic device(or wireless power receiver) 200 in a resonance method that can be employed in the embodiments disclosed herein.

A configuration of the power transmission unit 110 included in the wireless power transmitter 100 will be described with reference to FIG. 7A.

The power conversion unit 111 of the wireless power transmitter 100 may include a transmitting(Tx) coil 1111b, an inverter 1112, and a resonant circuit(or RESONANT GENERATION CIRCUIT) 1116. The inverter 1112 may be configured to be connected to the transmitting(Tx) coil 1111b and the resonant circuit(or RESONANT GENERATION CIRCUIT) 1116.

The transmitting(Tx) coil 1111b may be mounted separately from the transmitting(Tx) coil 1111a for transferring power according to the inductive coupling method, but may transfer power in the inductive coupling method and resonance coupling method using one single coil.

The transmitting(Tx) coil 1111b, as described above, forms a magnetic field for transferring power. The transmitting(Tx) coil 1111b and the resonant circuit(or RESONANT GENERATION CIRCUIT) 1116 generate resonance when alternating current power is applied thereto, and at this time, a vibration frequency may be determined based on an inductance of the transmitting(Tx) coil 1111b and a capacitance of the resonant circuit(or RESONANT GENERATION CIRCUIT) 1116.

For this purpose, the inverter 1112 transforms a DC input obtained from the power supply unit 190 into an AC waveform, and the transformed AC current is applied to the transmitting(Tx) coil 1111b and the resonant circuit(or RESONANT GENERATION CIRCUIT) 1116.

In addition, the power conversion unit 111 may further include a frequency adjustment unit 1117 for changing a resonant frequency of the power conversion unit 111. The resonant frequency of the power conversion unit 111 is determined based on an inductance and/or capacitance within a circuit constituting the power conversion unit 111 by Equation 1, and thus the power transmission control unit 112 may determine the resonant frequency of the power conversion unit 111 by controlling the frequency adjustment unit 1117 to change the inductance and/or capacitance.

The frequency adjustment unit 1117, for example, may be configured to include a motor for adjusting a distance between capacitors included in the resonant circuit(or RESONANT GENERATION CIRCUIT) 1116 to change a capacitance, or include a motor for adjusting a number of turns or diameter of the transmitting(Tx) coil 1111b to change an inductance, or include active elements for determining the capacitance and/or inductance On the other hand, the power conversion unit 111 may further include a power sensing unit 1115. The operation of the power sensing unit 1115 is the same as the foregoing description.

Referring to FIG. 7B, a configuration of the power supply unit 290 included in the electronic device(or wireless power receiver) 200 will be described. The power supply unit 290, as described above, may include the receiving (Rx) coil 2911b and resonant circuit(or RESONANT GENERATION CIRCUIT) 2912.

In addition, the power receiving unit 291 of the power supply unit 290 may further include a rectifier(or rectifying) circuit 2913 for converting an AC current generated by resonance phenomenon into DC. The rectifier(or rectifying) circuit 2913 may be configured similarly to the foregoing description.

Furthermore, the power receiving unit 291 may further include a power sensing unit 2914 for monitoring a voltage and/or current of the rectified power. The power sensing unit 2914 may be configured similarly to the foregoing description.

FIG. 8—Wireless Power Transmitter Configured to Include One or More Transmitting Coils FIG. 8 is a block diagram illustrating a wireless power transmitter configured to have one or more transmission coils receiving power according to an resonance coupling method that can be employed in the embodiments disclosed herein.

Referring to FIG. 8, the power conversion unit 111 of the wireless power transmitter 100 according to the embodiments disclosed herein may include one or more transmitting coils 1111b-1 to 1111b-n and resonant(or RESONANT GENERATION) circuits (1116-1 to 1116-n) connected to each transmitting coils. Furthermore, the power conversion unit 111 may further include a multiplexer 1113 for establishing and releasing the connection of some of the one or more transmitting coils 1111b-1 to 1111b-n.

The one or more transmitting coils 1111b-1 to 1111b-n may be configured to have the same vibration frequency, or some of them may be configured to have different vibration frequencies. It is determined by an inductance and/or capacitance of the resonant(or RESONANT GENERATION) circuits (1116-1 to 1116-n) connected to the one or more transmitting coils 1111b-1 to 1111b-n, respectively.

In the meantime, when one or more electronic devices 200 are disposed in an active area or a detection area of the wireless power transmitter 100 including the one or more transmitting coils 1111b-1 to 1111b-n, the power transmission control unit 112 may control the multiplexer 1113 to allow the electronic devices to be placed in different resonance coupling relations. Accordingly, the wireless power transmitter 100 may wirelessly transfer power to the one or more electronic devices by generating the wireless power signal using different coils.

In addition, the power transmission control unit 112 may set power with a different characteristic to be supplied to each of the coils corresponding to the electronic devices. Here, the wireless power transmitter 100 may transfer power by differently setting a power transmission scheme, a resonant frequency, efficiency, a characteristic and the like for each electronic device. The power transmission for one or more electronic devices will be described later with reference to FIG. 28. For this purpose, the frequency adjustment unit 1117 may be configured to change an inductance and/or capacitance of the resonant circuits (1116-1 to 1116-n) connected to the one or more transmitting coils 1111b-1 to 1111b-n, respectively.

Figure 9:
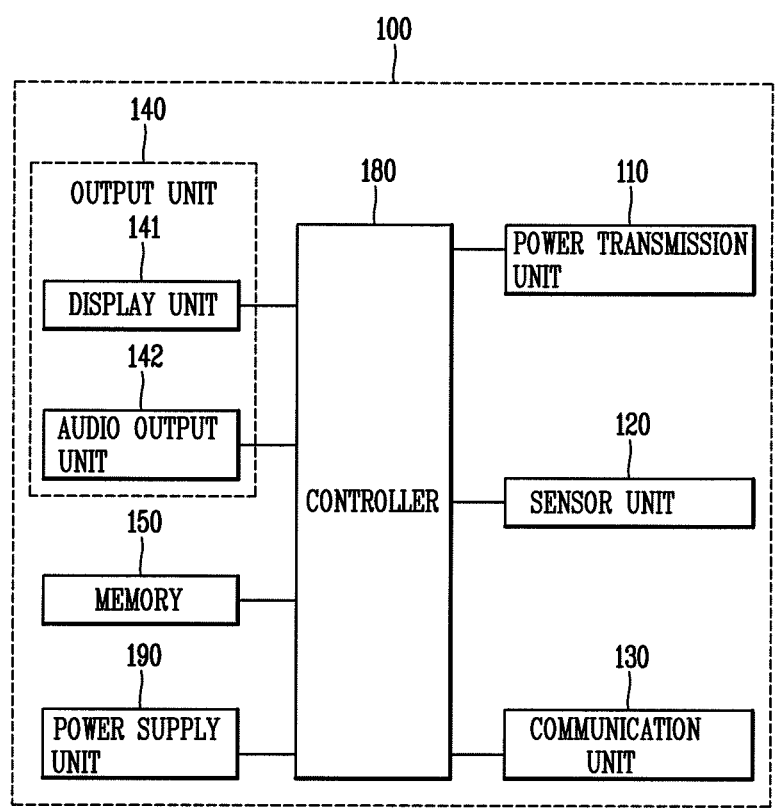
FIG. 9 is a block diagram illustrating a wireless power transmitter further including an additional element in addition to the configuration illustrated in FIG. 2A.

FIG. 9—Wireless Power Transmitter Implemented by Charger

On the other hand, hereinafter, an example of the wireless power transmitter implemented in the form of a wireless charger will be described.

FIG. 9 is a block diagram illustrating a wireless power transmitter further including an additional element in addition to the configuration illustrated in FIG. 2A.

Referring to FIG. 9, the wireless power transmitter 100 may further include a sensor unit 120, a communication unit 130, an output unit 140, a memory 150, and a control unit (or Controller) 180 in addition to the power transmission unit 110 and power supply unit 190 for supporting at least one of the foregoing inductive coupling method and resonance coupling method.

The control unit (or Controller) 180 controls the power transmission unit 110, the sensor unit 120, the communication unit 130, the output unit 140, the memory 150, and the power supply unit 190.

The control unit (or Controller) 180 may be implemented by a module separated from the power transmission control unit 112 in the power transmission unit 110 described with reference to FIG. 2.

The sensor unit 120 may include a sensor for detecting the location of the electronic device(or wireless power receiver) 200. The location information detected by the sensor unit 120 may be used for allowing the power transmission unit 110 to transfer power in an efficient manner.

For instance, in case of wireless power transfer according to the inductive coupling method, the sensor unit 120 may be operated as a detection unit, and the location information detected by the sensor unit 120 may be used to move or rotate the transmitting (Tx) coil 1111a in the power transmission unit 110.

Furthermore, for example, the wireless power transmitter 100 configured to include the foregoing one or more transmitting coils may determine coils that can be placed in an inductive coupling relation or resonance coupling relation to the receiving coil of the electronic device(or wireless power receiver) 200 among the one or more transmitting coils based on the location information of the electronic device(or wireless power receiver) 200.

On the other hand, the sensor unit 120 may be configured to monitor whether or not the electronic device(or wireless power receiver) 200 approaches a chargeable region. The approach or non-approach detection function of the sensor unit 120 may be carried out separately from the function of allowing the power transmission control unit 112 in the power transmission unit 110 to detect the approach or non-approach of the electronic device(or wireless power receiver) 200.

The communication unit 130 performs wired or wireless data communication with the electronic device(or wireless power receiver) 200. The communication unit 130 may include an electronic component for at least any one of Bluetooth™, Zigbee, Ultra Wide Band (UWB), Wireless USB, Near Field Communication (NFC), and Wireless LAN.

The output unit 140 may include at least one of a display unit 141 and an audio output unit (or SOUND OUTPUT UNIT) 142.

A program or commands performing the foregoing functions of the wireless power transmitter 100 may be stored in the memory 150. The control unit (or Controller) 180 may perform the program or commands stored in the memory 150 to transmit power in a wireless manner.

Figure 10:
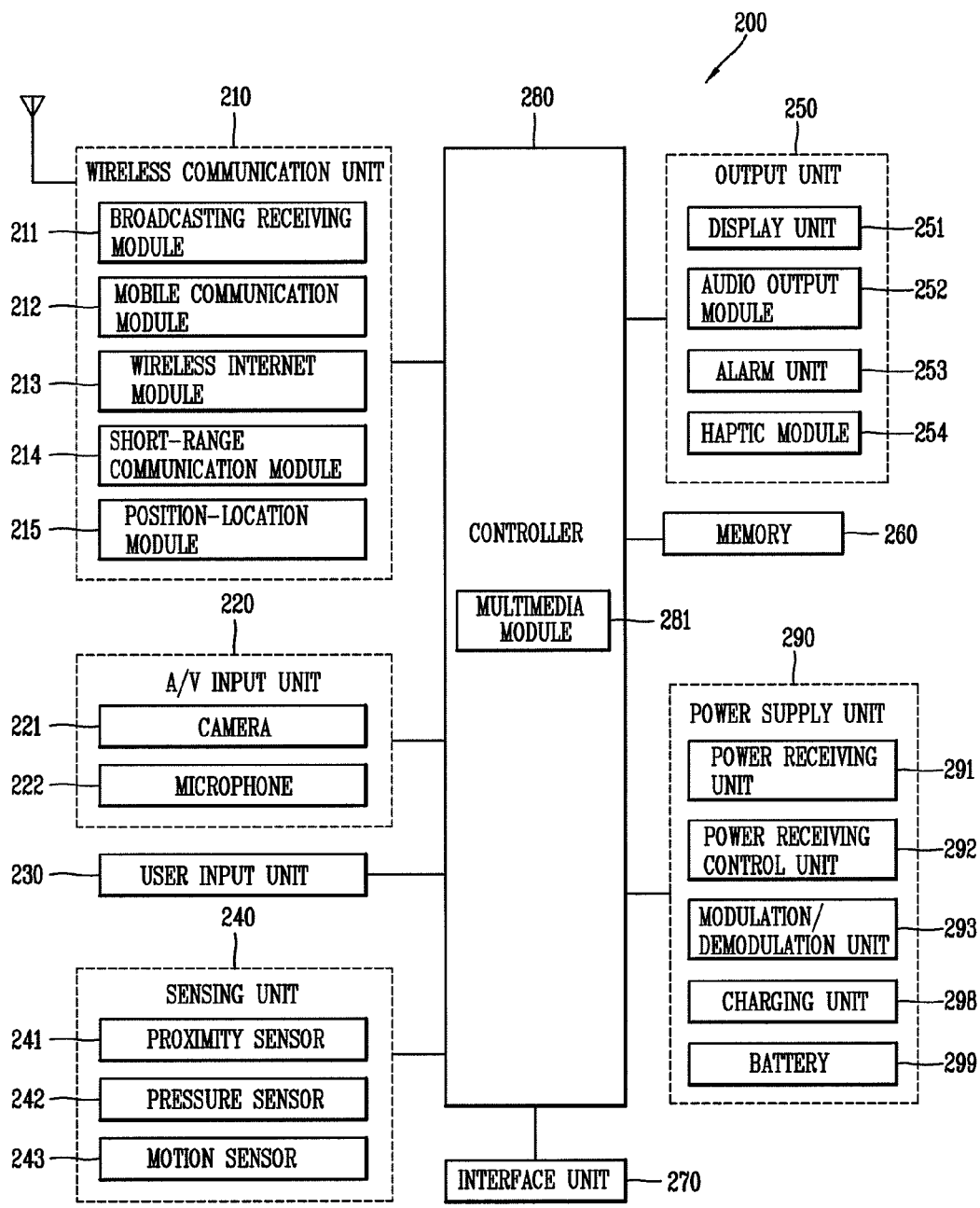
FIG. 10 is view illustrating a configuration in case where an electronic device(or wireless power receiver) 200 according to the embodiments disclosed herein is implemented in the form of a mobile terminal.

FIG. 10—Wireless Power Receiver Implemented with Mobile Terminal

FIG. 10 is view illustrating a configuration in case where an electronic device(or wireless power receiver) 200 according to the embodiments disclosed herein is implemented in the form of a mobile terminal.

The mobile communication terminal 200 may include a power supply unit 290 illustrated in FIG. 2, 4, or 7.

Furthermore, the terminal 200 may further include a wireless communication unit 210, an Audio/Video (A/V) input unit 220, a user input unit 230, a sensing unit 240, an output unit 250, a memory 260, an interface unit 270, and a controller 280. FIG. 10 illustrates the terminal 100 having various components, but it is understood that implementing all of the illustrated components is not a requirement. Greater or fewer components may alternatively be implemented.

Hereinafter, each component is described in sequence.

The wireless communication unit 210 may typically include one or more modules which permit wireless communications between the terminal 200 and a wireless communication system or between the terminal 200 and a network within which the terminal 200 is located. For example, the wireless communication unit 210 may include a broadcast receiving module 211, a mobile communication module 212, a wireless internet module 213, a short-range communication module 214, a position location module 215 and the like.

The broadcast receiving module 211 may be configured to receive digital broadcast signals transmitted from various types of broadcast systems. The broadcast receiving module 211 may be configured to be suitable for every broadcast system transmitting broadcast signals as well as the digital broadcasting systems.

Broadcast signals and/or broadcast associated information received via the broadcast receiving module 211 may be stored in a suitable device, such as a memory 260.

The mobile communication module 212 transmits/receives wireless signals to/from at least any one of a base station, an external portable terminal, and a server on a mobile communication network. The wireless signal may include audio call signal, video (telephony) call signal, or various formats of data according to transmission/reception of text/multimedia messages.

The wireless internet module 213 supports wireless Internet access for the mobile terminal 200. This module may be internally or externally coupled to the terminal 100.

The short-range communication module 214 denotes a module for short-range communications. Suitable technologies for implementing this module may include Bluetooth, Radio Frequency IDentification (RFID), Infrared Data Association (IrDA), Ultra-WideBand (UWB), ZigBee, and the like.

The wireless internet module 213 or the short-range communication module 214 may establish data communication connection to the wireless power transmitter 100.

Through the established data communication, the short-range communication module 214 may transmit the audio signal to the wireless power transmitter 100 through the short-range communication module. Furthermore, through the established data communication, the wireless internet module 213 or the short-range communication module 214 may transmit the information to the wireless power transmitter 100. Otherwise, the wireless internet module 213 or the short-range communication module 214 may transmit an audio signal received through a microphone integrated in the wireless power transmitter 100.

The position location module 215 is a module for acquiring a position of the terminal. An example of the position location module 215 may include a Global Position System (GPS) module.

Referring to FIG. 10, the A/V input unit 220 is configured to provide audio or video signal input to the portable terminal. The AN input unit 220 may include a camera 221 and a microphone 222. The camera 221 processes image frames of still or moving images obtained by an image sensor. The processed image frames may be displayed on the display unit 251.

The image frames processed by the camera 221 may be stored in the memory 260 or transmitted to the exterior via the wireless communication unit 210. At least one camera 221 may be provided therein according to the use environment.

The microphone 222 may receive an external audio signal by a microphone.

The user input unit 230 may generate input data to allow the user to control the operation of the terminal. The user input unit 230 may include a keypad, a dome switch, a touchpad (e.g., static pressure/capacitance), a jog wheel, a jog switch and the like.

The sensing unit 240 may include a proximity sensor 241, a pressure sensor 242, a motion sensor 243, and the like. The proximity sensor 241 detects an object approaching the mobile terminal 200, or the presence or absence of an object existing adjacent to the mobile terminal 200, and the like without any mechanical contact. At least one proximity sensor 241 may be provided according to the aspect of configuration.

The pressure sensor 242 may detect whether or not a pressure is applied to the mobile terminal 200, a size of the pressure, and the like.

The motion sensor 243 detects the location or movement of the mobile terminal 200.

The output unit 250 is provided to output visual, auditory, or tactile information. The output unit 250 may include a display unit 251, an audio output module 252, an alarm unit 253, a haptic module 254, and the like.

The display unit 251 may display (output) information processed in the terminal 200.

The display unit 251 may include at least one display according to a configured aspect of the terminal 200.

The proximity sensor refers to a sensor to sense the presence or absence of an object approaching a surface to be sensed, or an object disposed near a surface to be sensed, using an electromagnetic field or infrared rays without a mechanical contact.

The audio output module 252 may output audio data received from the wireless communication unit 210 or stored in the memory 260. The audio output module 252 may output audio signals relating to functions performed in the terminal 200.

The alarm 253 outputs signals notifying the occurrence of an event from the terminal 200.

The haptic module 254 generates various tactile effects which a user can feel.

The haptic module 254 may generate various tactile effects.

The haptic module 254 may be configured to transmit tactile effects through the user's direct contact, or the user's muscular sense using a finger or a hand.

The memory 260 may store a program for the processing and control of the controller 280. Alternatively, the memory 260 may temporarily store input/output data The memory 260 may be implemented using any type of suitable storage medium.

The interface unit 270 may generally be implemented to interface the portable terminal with all external devices.

The controller 280 typically controls the overall operations of the terminal 200. For example, the controller 280 performs the control and processing associated with telephony calls, data communications, video calls, and the like.

When the foregoing wireless charging is carried out, an operation of allowing the controller 280 to control each constituent element will be described in detail below with reference to the operation phase in FIG. 14. As described above, the Power reception control unit (or POWER RECEIVING CONTROL UNIT) 292 within the power supply unit 290 may be implemented to be included in the controller 280, and in the present disclosure, it should be understood that the controller 280 performs the operation by the Power reception control unit (or POWER RECEIVING CONTROL UNIT) 292.

The power supply unit 290 receives internal and external power under the control of the controller 280 to supply power required for the operation of each constituent element.

The power supply unit 290 is provided with a battery 299 for supplying power to each constituent element of the terminal 200, and the battery 299 may include a charger (or charging unit) 298 for performing wired or wireless charging.

Figure 11A:
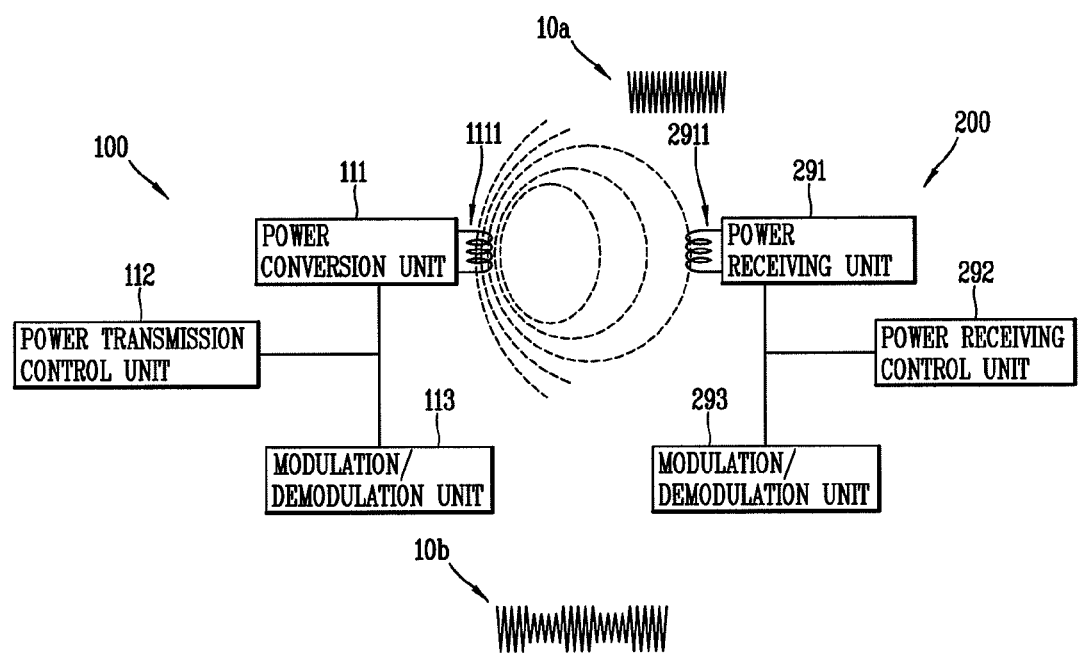
FIGS. 11A and 11B are a view illustrating the concept of transmitting and receiving a packet between a wireless power transmitter and an electronic device through the modulation and demodulation of a wireless power signal in transferring power in a wireless manner disclosed herein.
Figure 11B:
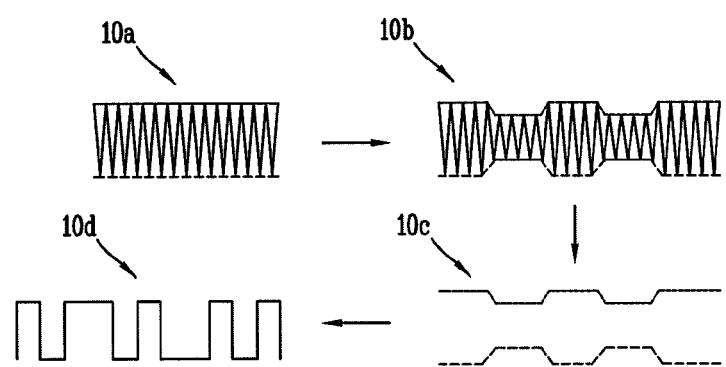

FIGS. 11A and 11B—Backscatter Modulation

FIGS. 11A and 11B is a view illustrating the concept of transmitting and receiving a packet between a wireless power transmitter and an electronic device through the modulation and demodulation of a wireless power signal in transferring power in a wireless manner disclosed herein.

Referring to FIG. 11A, the wireless power signal formed by the power conversion unit 111 forms a closed-loop within a magnetic field or electromagnetic field, and therefore, when the electronic device(or wireless power receiver) 200 modulates the wireless power signal while receiving the wireless power signal, the wireless power transmitter 100 may detect the modulated wireless power signal. The power communications modulation/demodulation unit 113 may demodulate the detected wireless power signal, and decodes the packet from the modulated wireless power signal.

On the other hand, a modulation method used for communication between the wireless power transmitter 100 and the electronic device(or wireless power receiver) 200 may be amplitude modulation. As described above, the amplitude modulation method may be a backscatter modulation method in which the power communications modulation/demodulation unit 293 at the side of the electronic device(or wireless power receiver) 200 may change an amplitude of the wireless power signal 10a formed by the power conversion unit 111 and the Power reception control unit (or POWER RECEIVING CONTROL UNIT) 292 at the side of the wireless power transmitter 100 detects an amplitude of the modulated wireless power signal 10b.

Specifically, further referring to FIG. 11B, the Power reception control unit (or POWER RECEIVING CONTROL UNIT) 292 at the side of the electronic device(or wireless power receiver) 200 modulates the wireless power signal 10a received through the power receiving unit 291 by changing a load impedance within the power communications modulation/demodulation unit 293. The Power reception control unit (or POWER RECEIVING CONTROL UNIT) 292 modulates the wireless power signal 10a to include a packet including a power control message to be transmitted to the wireless power transmitter 100.

Then, the power transmission control unit 112 at the side of the wireless power transmitter 100 demodulates the modulated wireless power signal 10b through an envelope detection process, and decodes the detected signal 10c into digital data 10d. The demodulation process detects a current or voltage flowing into the power conversion unit 111 to be classified into two states, a HI phase and a LO phase, and acquires a packet to be transmitted by the electronic device (or wireless power receiver) 200 based on digital data classified according to the states.

Figure 12A:
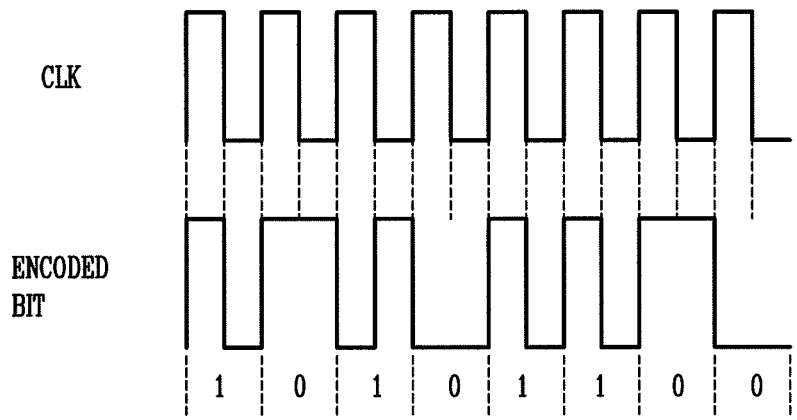
FIGS. 12A and 12B is a view illustrating a method of showing data bits and byte constituting a power control message provided by the wireless power transmitter 100.
Figure 12B:
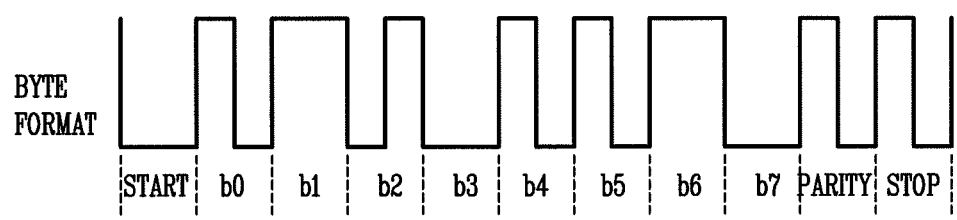

FIGS. 12A and 12B—Bit Encoding, Byte Format

FIGS. 12A and 12B is a view illustrating a method of showing data bits and byte constituting a power control message provided by the wireless power transmitter 100.

Referring to FIG. 12A, the power transmission control unit 112 detects an encoded bit using a clock signal (CLK) from an envelope detected signal. The detected encoded bit is encoded according to a bit encoding method used in the modulation process at the side of the electronic device(or wireless power receiver) 200. The bit encoding method may correspond to any one of non-return to zero (NRZ) and bi-phase encoding.

For instance, the detected bit may be a differential bi-phase (DBP) encoded bit. According to the DBP encoding, the Power reception control unit (or POWER RECEIVING CONTROL UNIT) 292 at the side of the electronic device (or wireless power receiver) 200 is allowed to have two state transitions to encode data bit 1, and to have one state transition to encode data bit 0. In other words, data bit 1 may be encoded in such a manner that a transition between the HI state and LO state is generated at a rising edge and falling edge of the clock signal, and data bit 0 may be encoded in such a manner that a transition between the HI state and LO state is generated at a rising edge of the clock signal.

On the other hand, the power transmission control unit 112 may acquire data in a byte unit using a byte format constituting a packet from a bit string detected according to the bit encoding method. For instance, the detected bit string may be transferred by using an 11-bit asynchronous serial format as illustrated in FIG. 12B. In other words, the detected bit may include a start bit indicating the beginning of a byte and a stop bit indicating the end of a byte, and also include data bits (b0 to b7) between the start bit and the stop bit. Furthermore, it may further include a parity bit for checking an error of data. The data in a byte unit constitutes a packet including a power control message.

Figure 13:
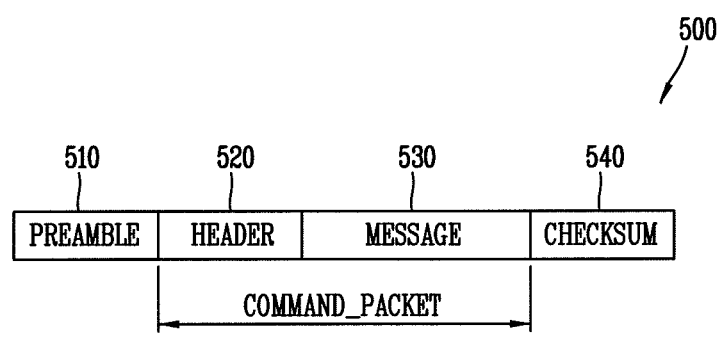
FIG. 13 is a view illustrating a packet including a power control message used in a contactless (wireless) power transfer method according to the embodiments disclosed herein.

FIG. 13—Packet Format

FIG. 13 is a view illustrating a packet including a power control message used in a contactless power transfer method according to the embodiments disclosed herein.

The packet 500 may include a preamble 510, a header 520, a message 530, and a checksum 540.

The preamble 510 may be used to perform synchronization with data received by the wireless power transmitter 100 and detect the start bit of the header 520. The preamble 510 may be configured to repeat the same bit. For instance, the preamble 510 may be configured such that data bit 1 according to the DBP encoding is repeated eleven to twenty five times.

The header 520 may be used to indicate a type of the packet 500. A size of the message 530 and the kind thereof may be determined based on a value indicated by the header 520. The header 520 is a value having a predetermined size to be positioned subsequent to the preamble 510. For instance, the header 520 may be a byte in size.

The message 530 may be configured to include data determined based on the header 520. The message 530 has a predetermined size according to the kind thereof.

The checksum 540 may be used to detect an error that can be occurred in the header 520 and the message 530 while transmitting a power control message. The header 520 and the message 530 excluding the preamble 510 for synchronization and the checksum 540 for error checking may be referred to as command-packet.

Figure 14:
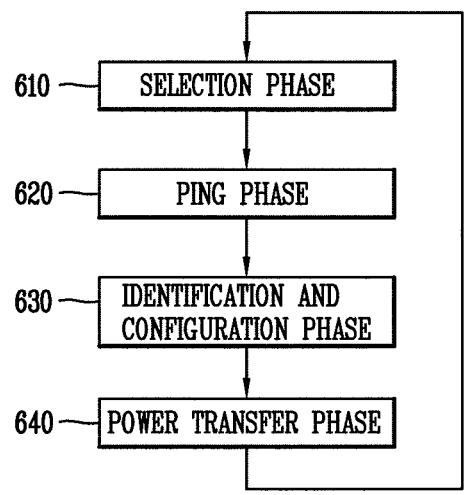
FIG. 14 is a view illustrating the operation phases of the wireless power transmitter 100 and electronic device(or wireless power receiver) 200 according to the embodiments disclosed herein.

FIG. 14—Operation Phases

Hereinafter, description will be given of operation phases of the wireless power transmitter 100 and the electronic device(or wireless power receiver) 200.

FIG. 14 illustrates the operation phases of the wireless power transmitter 100 and electronic device(or wireless power receiver) 200 according to the embodiments disclosed herein. Furthermore, FIGS. 15 through 20 illustrates the structure of packets including a power control message between the wireless power transmitter 100 and electronic device(or wireless power receiver) 200.

Referring to FIG. 14, the operation phases of the wireless power transmitter 100 and the electronic device(or wireless power receiver) 200 for wireless power transfer may be divided into a selection phase (or state) 610, a ping phase (or state) 620, an identification and configuration phase (or state) 630, and a power transfer phase (or state) 640.

The wireless power transmitter 100 detects whether or not objects exist within a range that the wireless power transmitter 100 can transmit power in a wireless manner in the selection state 610, and the wireless power transmitter 100 sends a detection signal to the detected object and the electronic device(or wireless power receiver) 200 sends a response to the detection signal in the ping state 620.

Furthermore, the wireless power transmitter 100 identifies the electronic device (or wireless power receiver) 200 selected through the previous states and acquires configuration information for power transmission in the identification and configuration state 630. The wireless power transmitter 100 transmits power to the electronic device(or wireless power receiver) 200 while controlling power transmitted in response to a control message received from the electronic device(or wireless power receiver) 200 in the power transfer state 640.

Hereinafter, each of the operation phases will be described in detail.

1) Selection State

The wireless power transmitter 100 in the selection state 610 performs a detection process to select the electronic device(or wireless power receiver) 200 existing within a detection area. The detection area, as described above, refers to a region in which an object within the relevant area can effect on the characteristic of the power of the power conversion unit 111. Compared to the ping state 620, the detection process for selecting the electronic device(or wireless power receiver) 200 in the selection state 610 is a process of detecting a change of the power amount for forming a wireless power signal in the power conversion unit at the side of the wireless power transmitter 100 to check whether any object exists within a predetermined range, instead of the scheme of receiving a response from the electronic device (or wireless power receiver) 200 using a power control message. The detection process in the selection state 610 may be referred to as an analogue ping process in the aspect of detecting an object using a wireless power signal without using a packet in a digital format in the ping state 620 which will be described later.

The wireless power transmitter 100 in the selection state 610 can detect that an object comes in or out within the detection area. Furthermore, the wireless power transmitter 100 can distinguish the electronic device(or wireless power receiver) 200 capable of transferring power in a wireless manner from other objects (for example, a key, a coin, etc.) among objects located within the detection area.

As described above, a distance that can transmit power in a wireless manner may be different according to the inductive coupling method and resonance coupling method, and thus the detection area for detecting an object in the selection state 610 may be different from one another.

First, in case where power is transmitted according to the inductive coupling method, the wireless power transmitter 100 in the selection state 610 can monitor an interface surface to detect the alignment and removal of objects.

Furthermore, the wireless power transmitter 100 may detect the location of the electronic device(or wireless power receiver) 200 placed on an upper portion of the interface surface. As described above, the wireless power transmitter 100 formed to include one or more transmitting coils may perform the process of entering the ping state 620 in the selection state 610, and checking whether or not a response to the detection signal is transmitted from the object using each coil in the ping state 620 or subsequently entering the identification state 630 to check whether identification information is transmitted from the object. The wireless power transmitter 100 may determine a coil to be used for contactless power transfer based on the detected location of the electronic device(or wireless power receiver) 200 acquired through the foregoing process.

Furthermore, when power is transmitted according to the resonance coupling method, the wireless power transmitter 100 in the selection state 610 can detect an object by detecting that any one of a frequency, a current and a voltage of the power conversion unit is changed due to an object located within the detection area.

On the other hand, the wireless power transmitter 100 in the selection state 610 may detect an object by at least any one of the detection methods using the inductive coupling method and resonance coupling method. The wireless power transmitter 100 may perform an object detection process according to each power transmission method, and subsequently select a method of detecting the object from the coupling methods for contactless power transfer to advance to other states 620, 630, 640.

On the other hand, for the wireless power transmitter 100, a wireless power signal formed to detect an object in the selection state 610 and a wireless power signal formed to perform digital detection, identification, configuration and power transmission in the subsequent states 620, 630, 640 may have a different characteristic in the frequency, strength, and the like. It is because the selection state 610 of the wireless power transmitter 100 corresponds to an idle state for detecting an object, thereby allowing the wireless power transmitter 100 to reduce consumption power in the idle state or generate a specialized signal for effectively detecting an object.

2) Ping State

The wireless power transmitter 100 in the ping state 620 performs a process of detecting the electronic device(or wireless power receiver) 200 existing within the detection area through a power control message. Compared to the detection process of the electronic device(or wireless power receiver) 200 using a characteristic of the wireless power signal and the like in the selection state 610, the detection process in the ping state 620 may be referred to as a digital ping process.

The wireless power transmitter 100 in the ping state 620 forms a wireless power signal to detect the electronic device(or wireless power receiver) 200, modulates the wireless power signal modulated by the electronic device(or wireless power receiver) 200, and acquires a power control message in a digital data format corresponding to a response to the detection signal from the modulated wireless power signal. The wireless power transmitter 100 may receive a power control message corresponding to the response to the detection signal to recognize the electronic device(or wireless power receiver) 200 which is a subject of power transmission.

The detection signal formed to allow the wireless power transmitter 100 in the ping state 620 to perform a digital detection process may be a wireless power signal formed by applying a power signal at a specific operating point for a predetermined period of time. The operating point may denote a frequency, duty cycle, and amplitude of the voltage applied to the transmitting(Tx) coil. The wireless power transmitter 100 may generate the detection signal generated by applying the power signal at a specific operating point for a predetermined period of time, and attempt to receive a power control message from the electronic device(or wireless power receiver) 200.

Figure 15:
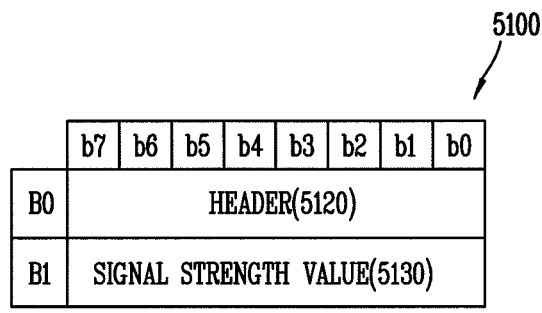
FIGS. 15 through 19 are views illustrating the structure of packets including a power control message between the wireless power transmitter 100 and electronic device(or wireless power receiver) 200.

On the other hand, the power control message corresponding to a response to the detection signal may be a message indicating a strength of the wireless power signal received by the electronic device(or wireless power receiver) 200. For example, the electronic device (or wireless power receiver) 200 may transmit a signal strength packet 5100 including a message indicating the received strength of the wireless power signal as a response to the detection signal as illustrated in FIG. 15. The packet 5100 may include a header 5120 for notifying a packet indicating the signal strength and a message 5130 indicating a strength of the power signal received by the electronic device(or wireless power receiver) 200. The strength of the power signal within the message 5130 may be a value indicating a degree of inductive coupling or resonance coupling for power transmission between the wireless power transmitter 100 and the electronic device(or wireless power receiver) 200.

The wireless power transmitter 100 may receive a response message to the detection signal to find the electronic device(or wireless power receiver) 200, and then extend the digital detection process to enter the identification and configuration state 630. In other words, the wireless power transmitter 100 maintains the power signal at a specific operating point subsequent to finding the electronic device(or wireless power receiver) 200 to receive a power control message required in the identification and configuration state 630.

However, if the wireless power transmitter 100 is not able to find the electronic device(or wireless power receiver) 200 to which power can be transferred, then the operation phase of the wireless power transmitter 100 will be returned to the selection state 610.

3) Identification and Configuration State

The wireless power transmitter 100 in the identification and configuration state 630 may receive identification information and/or configuration information transmitted by the electronic device(or wireless power receiver) 200, thereby controlling power transmission to be effectively carried out.

Figure 16A:
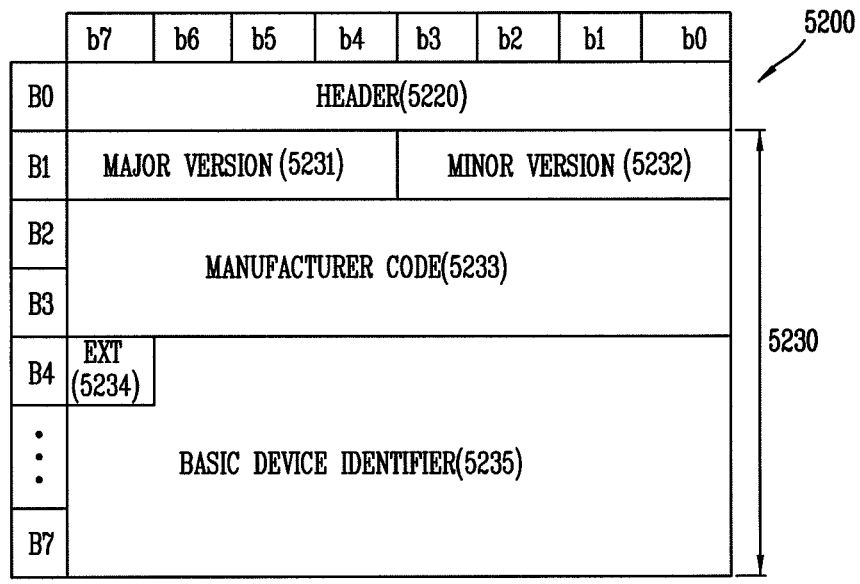
Figure 16B:
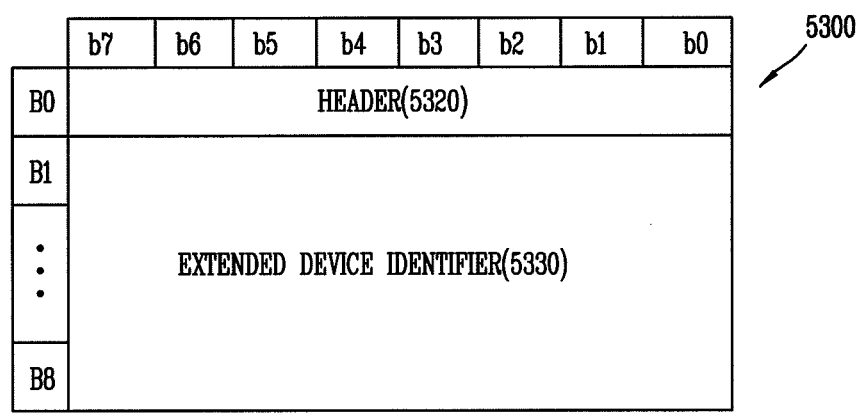

The electronic device(or wireless power receiver) 200 in the identification and configuration state 630 may transmit a power control message including its own identification information. For this purpose, the electronic device(or wireless power receiver) 200, for instance, may transmit an identification packet 5200 including a message indicating the identification information of the electronic device(or wireless power receiver) 200 as illustrated in FIG. 16A. The packet 5200 may include a header 5220 for notifying a packet indicating identification information and a message 5230 including the identification information of the electronic device. The message 5230 may include information (5231 and 5232) indicating a version of the contract for contactless power transfer, information 5233 for identifying a manufacturer of the electronic device(or wireless power receiver) 200, information 5234 indicating the presence or absence of an extended device identifier, and a basic device identifier 5235. Furthermore, if it is displayed that an extended device identifier exists in the information 5234 indicating the presence or absence of an extended device identifier, then an extended identification packet 5300 including the extended device identifier as illustrated in FIG. 16B will be transmitted in a separate manner. The packet 5300 may include a header 5320 for notifying a packet indicating an extended device identifier and a message 5330 including the extended device identifier. When the extended device identifier is used as described above, information based on the manufacturer's identification information 5233, the basic device identifier 5235 and the extended device identifier 5330 will be used to identify the electronic device (or wireless power receiver) 200.

Figure 17:
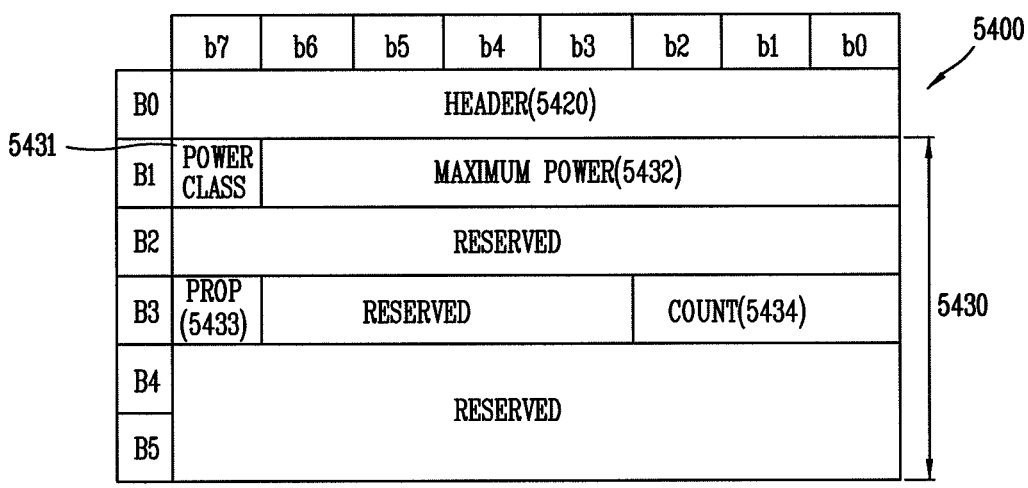

The electronic device(or wireless power receiver) 200 may transmit a power control message including information on expected maximum power in the identification and configuration state 630. To this end, the electronic device(or wireless power receiver) 200, for instance, may transmit a configuration packet 5400 as illustrated in FIG. 17. The packet may include a header 5420 for notifying that it is a configuration packet and a message 5430 including information on the expected maximum power. The message 5430 may include power class 5431, information 5432 on expected maximum power, an indicator 5433 indicating a method of determining a current of a main cell at the side of the wireless power transmitter, and the number 5434 of optional configuration packets. The indicator 5433 may indicate whether or not a current of the main cell at the side of the wireless power transmitter is determined as specified in the contract for wireless power transfer.

Meanwhile, the electronic device(or wireless power receiver) 200 according to the exemplary embodiments may transmit a power control message, which includes required power information thereof and associated profile information, to the wireless power transmitter 100. In some exemplary embodiments, the required power information related to the electronic device(or wireless power receiver) 200 or the profile information may be transmitted by being included in the configuration packet 5400 as illustrated in FIG. 17. Alternatively, the required power information related to the electronic device(or wireless power receiver) 200 or the profile information may be transmitted by being included in a separate packet for configuration.

On the other hand, the wireless power transmitter 100 may generate a power transfer contract which is used for power charging with the electronic device(or wireless power receiver) 200 based on the identification information and/or configuration information. The power transfer contract may include the limits of parameters determining a power transfer characteristic in the power transfer state 640.

The wireless power transmitter 100 may terminate the identification and configuration state 630 and return to the selection state 610 prior to entering the power transfer state 640. For instance, the wireless power transmitter 100 may terminate the identification and configuration state 630 to find another electronic device that can receive power in a wireless manner.

4) Power Transfer State

The wireless power transmitter 100 in the power transfer state 640 transmits power to the electronic device(or wireless power receiver) 200.

Figure 18:
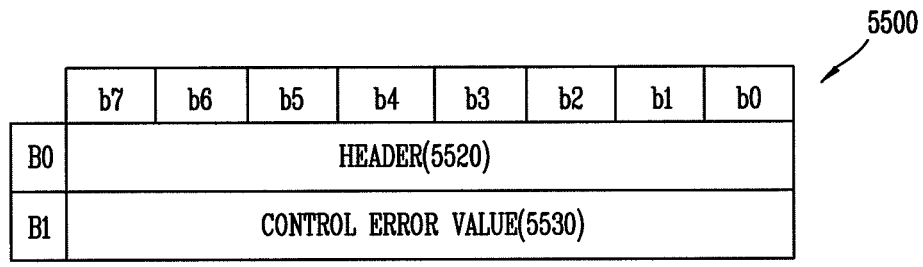

The wireless power transmitter 100 may receive a power control message from the electronic device(or wireless power receiver) 200 while transferring power, and control a characteristic of the power applied to the transmitting coil in response to the received power control message. For example, the power control message used to control a characteristic of the power applied to the transmitting coil may be included in a control error packet 5500 as illustrated in FIG. 18. The packet 5500 may include a header 5520 for notifying that it is a control error packet and a message 5530 including a control error value. The wireless power transmitter 100 may control the power applied to the transmitting coil according to the control error value. In other words, a current applied to the transmitting coil may be controlled so as to be maintained if the control error value is "0", reduced if the control error value is a negative value, and increased if the control error value is a positive value.

The wireless power transmitter 100 may monitor parameters within a power transfer contract generated based on the identification information and/or configuration information in the power transfer state 640. As a result of monitoring the parameters, if power transmission to the electronic device(or wireless power receiver) 200 violates the limits included in the power transfer contract, then the wireless power transmitter 100 may cancel the power transmission and return to the selection state 610.

The wireless power transmitter 100 may terminate the power transfer state 640 based on a power control message transferred from the electronic device(or wireless power receiver) 200.

For example, if the charging of a battery has been completed while charging the battery using power transferred by the electronic device(or wireless power receiver) 200, then a power control message for requesting the suspension of wireless power transfer will be transferred to the wireless power transmitter 100. In this case, the wireless power transmitter 100 may receive a message for requesting the suspension of the power transmission, and then terminate wireless power transfer, and return to the selection state 610.

For another example, the electronic device(or wireless power receiver) 200 may transfer a power control message for requesting renegotiation or reconfiguration to update the previously generated power transfer contract. The electronic device(or wireless power receiver) 200 may transfer a message for requesting the renegotiation of the power transfer contract when it is required a larger or smaller amount of power than the currently transmitted power amount. In this case, the wireless power transmitter 100 may receive a message for requesting the renegotiation of the power transfer contract, and then terminate contactless power transfer, and return to the identification and configuration state 630.

Figure 19:
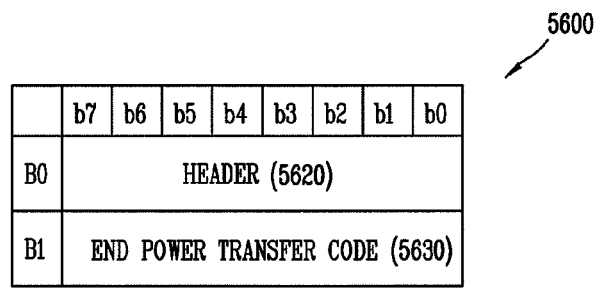

To this end, a message transmitted by the electronic device(or wireless power receiver) 200, for instance, may be an end power transfer packet 5600 as illustrated in FIG. 19. The packet 5600 may include a header 5620 for notifying that it is an end power transfer packet and a message 5630 including an end power transfer code indicating the cause of the suspension. The end power transfer code may indicate any one of charge complete, internal fault, over temperature, over voltage, over current, battery failure, reconfigure, no response, and unknown error.

Wireless Power Transmission/Reception System Using Multiple Communication Protocols In general, a contactless wireless charging method is an energy transfer conception, capable of electromagnetically transferring energy with eliminating wires (cables) from the conventional method, which transfers energy via a wire and uses it as power of an electronic device.

The contactless wireless transfer methods may include an inductive power transfer method.

The inductive power transfer may be a power transfer method using electromagnetic induction that a power transmitting unit (or power conversion unit 111) generates a magnetic field by use of a coil (primary coil 1111), and a coil (secondary coil 2911) is situated at a position where current can be induced.

This method has already been utilized in devices, such as electric toothbrushes, wireless coffee ports and the like that are frequently used in real lives, and may also be commercialized for charging portable devices such as smart phones and the like.

In order for wireless power transmitters and receivers, which are produced by different companies, to properly play their own roles, technologies associated with wireless power transfer are being standardized by Wireless Power consortium (WPC).

A wireless power transmitter and a wireless power receiver may need a communication protocol for performing data transmission and reception for wireless power transfer therebetween.

Examples of the communication protocol may include ASK/NRZI, ASK/NRZ_L, FSK/Manxhester, FSK/NRZI, Bluetooth™, Zigbee, Ultra Wide Band (UWB), Wireless USB, Near Field Communication (NFC) or Wireless LAN.

Figure 20:
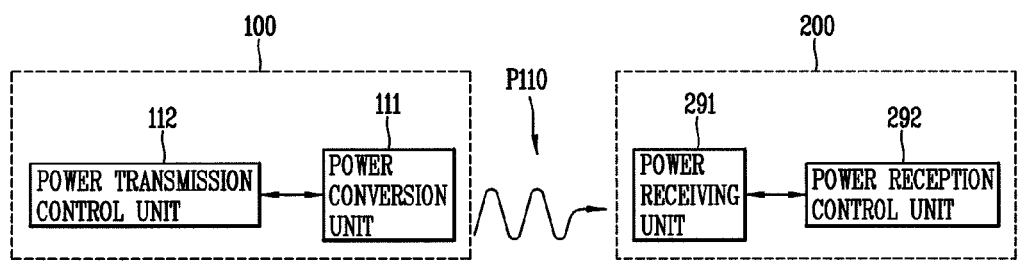
FIG. 20 is a view illustrating a configuration of a wireless power system in accordance with one exemplary embodiment.

FIG. 20 is a view illustrating a construction of a wireless power system in accordance with one exemplary embodiment.

As illustrated in FIG. 20, a wireless power system in accordance with one exemplary embodiment may include a wireless power transmitter 100 and a wireless power receiver 200.

The wireless power transmitter 100 may transfer power to the wireless power receiver 200 in a wireless manner by transmitting a wireless power signal p110.

The wireless power receiver 200 may include a power receiving unit 291 and a power reception control unit 292.

The power receiving unit 291 may receive power, which is transferred by the wireless power transmitter 100 in the wireless manner, by receiving the wireless power signal p110.

The power receiving unit 291 may include constituent elements required to receive the wireless power signal according to a wireless power transfer method. Also, the power receiving unit 291 may receive power according to at least one wireless power transfer method, and in this case, may include different constituent elements according to each method.

First, the power receiving unit 291 may include a coil for receiving a wireless power signal, which is transferred in the form of a magnetic field or electromagnetic field having an oscillation characteristic.

For example, in some exemplary embodiments, the power receiving unit 291 may include, as a constituent element according to an inductive coupling method, a secondary coil to which a current is induced by a changing magnetic field. Also, in other exemplary embodiments, the power receiving unit 291 may include, as constituent elements according to a resonance coupling method, a coil and a resonant generation circuit in which resonance phenomenon is generated by a magnetic field having a specific resonant frequency.

Here, in exemplary embodiments, the power receiving unit 291 may receive power according to at least one wireless power transfer method. In this case, the power receiving unit 291 may be implemented to receive power using a single coil or using a coil, which is formed differently according to each power transfer method.

The power reception control unit 292 may control constituent elements of the wireless power receiver 200 to provide a communication protocol deciding function for data transmission or reception between the wireless power receiver 200 and the wireless power transmitter 100.

In one exemplary embodiment, the power reception control unit 292 may transmit first communication protocol information, which indicates communication protocols supportable by the wireless power receiver 200, to the wireless power transmitter 100.

The first communication protocol information may be transmitted to the wireless power transmitter 100 according to various methods.

For example, the first communication protocol information may be transmitted to the wireless power transmitter 100 by modulation of the wireless power signal. That is, the power reception control unit 292 may generate a packet including the first communication protocol information, and the power receiving unit 291 may modulate the wireless power signal to include the packet.

Such method may be the same as or similar to the aforementioned power control message transmission method performed by the power reception control unit 292.

Therefore, in order to transmit the first communication protocol information, the wireless power receiver 200 may further include a power communications modulation/demodulation unit 293 electrically connected to the power receiving unit 291.

The modulation/demodulation unit 293, similar to the wireless power transmitter 100, may be used to transmit the first communication protocol information via the wireless power signal.

A wireless power signal, which is generated by the power conversion unit 111 of the wireless power transmitter 100, may be received by the power receiving unit 291. Here, the power reception control unit 292 may control the modulation/demodulation unit 293 of the wireless power receiver 200 to modulate the wireless power signal. For example, the power reception control unit 292 may modulate the wireless power signal by changing reactance of the modulation/demodulation unit 293 connected to the power receiving unit 291. This may be referred to as a back-scattering method.

The modulation of the wireless power signal may result in changes of current and/or voltage of the power conversion unit 111, which generates the wireless power signal. Here, the modulation/demodulation unit 113 of the wireless power transmitter 100 may execute a demodulation process by sensing the changes of the current and/or the voltage of the power conversion unit 111, acquiring the first communication protocol information (or the packet including the first communication protocol information).

Also, for instance, the first communication protocol information may be transmitted to the wireless power transmitter 100 through a communication module which is separately disposed in the wireless power receiver 200.

The communication module may support at least one of Zigbee, Bluetooth and NFC.

In one exemplary embodiment, upon reception of second communication protocol information, which indicates communication protocols selected based on the first communication protocol information, from the wireless power transmitter 100, the power reception control unit 292 may decide a communication protocol for transmitting or receiving data for receiving the wireless power signal based on the second communication protocol information.

The second communication protocol information may also be received by various methods. For example, the wireless power receiver 200 may acquire the second communication protocol information by receiving the wireless power signal, which has been modulated to include the second communication protocol information. Also, the wireless power receiver 200 may acquire the second communication protocol information through the communication module.

In one exemplary embodiment, the wireless power transmitter 100 may include a power conversion unit 111 and a power transmission control unit 112.

The power conversion unit 111 may generate a wireless power signal.

In detail, the power conversion unit 111, as aforementioned, may play a role of converting power supplied from a transmitting side power supply unit 190 into a wireless power signal to transfer to the wireless power receiver (or electronic device) 200.

The wireless power signal transferred by the power conversion unit 111 may be generated in the form of a magnetic field or electromagnetic field having a vibration characteristic.

The power transmission control unit 112 may control each constituent element included in the power conversion unit 111. In exemplary embodiments, the power transmission control unit 112 may be integrated with another controller (not shown) for control of the wireless power transmitter 100.

In one exemplary embodiment, when the power transmission control unit 112 receives first communication protocol information, which indicates communication protocols supportable by the wireless power receiver 200, from the wireless power receiver 200, the power transmission control unit 112 may decide a communication protocol for transmitting or receiving data for transmission of the wireless power signal based on the first communication protocol information.

Also, the power transmission control unit 112 may transmit second communication protocol information indicating the decided communication protocol to the wireless power receiver 200.

Overview of Communication Protocol Selection Method in Accordance with One Exemplary Embodiment A technology disclosed in this specification may be a technology including a conception of extending Chapter 6 Communication Interface for use by adding a new phase between an identification & configuration phase and a power transfer phase of Chapter 5 System Control of Wireless Power Specification part 1 System Description of Wireless Power Consortium (WPC).

The technology proposed in this specification aims to extending an application range of a wireless power transmitter/receiver by introducing a communication protocol selection method for allowing the use of a plurality of communication protocols between a wireless power transmitting unit (or a wireless power transmitter 100) and a wireless power receiving unit (or a wireless power receiver 200).

Hereinafter, an overview of the technology proposed in this specification will be described.

1) Wireless power transmitter and receiver may generate a list of communication protocols (i.e., communication protocol list) selected from a communication protocol catalog, and select at least one communication method (or at least communication protocol) from the list.

2) The communication protocol catalog may be created by predetermining all of communication protocols supportable by both the wireless power transmitter and the wireless power receiver. The wireless power transmitter and receiver may implement a communication function by selecting a communication protocol from the catalog.

3) In Item 1), the receiver may transfer communication protocol information supportable by itself to the transmitter, allowing the transmitter to select the communication method (protocol).

4) In Item 1), a method for transferring a plurality of communication protocols may be subject to a communication protocol (or reference communication protocol), which basically ensures an information transfer between the transmitter and the receiver.

5) In Item 1), the plurality of communication protocols may include a communication method (or communication protocol) by an internal change (variation, transformation, modulation) of a power transfer channel (or back-scattering) or a communication method (or communication protocol) through other channels except for a power transfer channel (or communication method using a separate communication module).

6) In Item 2), the communication protocol catalog may include types (titles, contents, descriptions) of communication methods and also include data formed by a set of bits representing a communication direction and a communication protocol number for transferring such type.

7) In Item 2), the data formed with numerals representing the communication directions and communication methods may be included in a user definition area specified in the conventional specification (for example, WPC standards) (for example, in a reserved bit of a reserved packet type disclosed in the WPC standards or a conventionally used packet type), to be kept compatible with the conventional (existing) communication method.

For example, the wireless power receiver 200 may create a communication protocol list which can be supported by itself, and transmit data associated with the communication protocol list according to the conventional (existing) method (or a reference communication protocol).

Also, the wireless power receiver may support at least one communication protocol.

The wireless power receiver may create a list by selecting only one of the supportable communication protocols or all of the supportable communication protocols. Communication protocols included in the communication protocol list may be available if it is supportable by the receiver and the number of communication protocols may depend on applications (or embodiments). Also, communication protocols sorted on an upper position of the list may have higher priorities. Therefore, a communication protocol having a higher priority may be selected from the plurality of communication protocols included in the communication protocol list.

Upon receiving the communication protocol list, the wireless power transmitter 100 may select supportable communication protocols, one by one, from the received communication protocol list according to a communication direction (for example, a transmitting direction or a receiving direction). The wireless power transmitter 100 may then generate a communication protocol list of the selected communication protocols, transmitting it to the wireless power receiver.

The wireless power transmitter may make preparations for communication according to the selected communication protocol. The wireless power transmitter may perform only reception according to the conventional method (or reference communication protocol) to transfer power in a wireless manner when it fails to receive the communication protocol list.

The wireless power receiver may check the transmitted communication protocol list to get ready for communication according to the list. The wireless power receiver may receive power in a wireless manner according to the conventional method (or reference communication protocol) when it fails to receive a response from the wireless power transmitter or receives the response without a communication protocol list.

Here, the conventional method (or reference communication protocol) may be a communication protocol for ensuring (guaranteeing) data transmission or data reception between the wireless power transmitter 100 and the wireless power receiver 200. For example, the conventional method may be a communication method by modulation of a wireless power signal (for example, back-scattering). In this case, the modulation mechanism may be ASK.

FIG. 21 is an exemplary view illustrating a communication protocol catalogue in accordance with one exemplary embodiment.

As illustrated in FIG. 21, the communication protocol catalogue may include information indicating all of predetermined communication protocols which are supportable by the wireless power transmitter 100 or the wireless power receiver 200.

The communication protocol may include physical, logical and applicable types, and be available if it is predetermined.

Each communication protocol may be given a single communication protocol number.

In one exemplary embodiment, each of the communication protocols may be given a 7-bit number, and the uppermost 1 bit may indicate a communication direction (transmitting or receiving direction).

For example, the communication protocol catalogue may specify totally 128 types of communication protocols in the range of 0x00~7F in case of the exemplary embodiment.

The wireless power transmitter 100 or the wireless power receiver 200 may create a communication protocol list, which includes information indicating communication protocols supportable by the device, of the communication protocol catalogue.

FIG. 22 is an exemplary view illustrating communication protocol information in accordance with one exemplary embodiment.

As illustrated in FIG. 22, the communication protocol information may include information related to a communication protocol number represented with 6 bits (b0~b6) and a communication direction (transmitting or receiving direction) represented with the uppermost bit (b7).

For example, when the communication protocol number is 0x10 (0010000), the type (or, title, contents, description, etc.) of the communication protocol may be Zigbee corresponding to '010000' as the lower 6-bit information, and the communication direction may indicate a receiving direction corresponding to '0' as the uppermost bit information.

FIG. 23 is an exemplary view illustrating a communication protocol list in accordance with one exemplary embodiment.

As illustrated in FIG. 23, a communication protocol list according to one exemplary embodiment may be a list containing communication protocols, which are actually supportable by the wireless power transmitter 100 or the wireless power receiver 200, of communication protocols included in a communication protocol catalogue.

When a plurality of communication protocols are supportable, the plurality of communication protocols may be given priorities in the order of being arranged in the list. A communication protocol having a higher priority may be located at the upper position of the list. For example, referring to FIG. 23, the communication protocol B0 may have a higher priority than the communication protocol B1. Therefore, the B0 may be highly likely to be decided as a communication protocol by the wireless power transmitter 100 or the wireless power receiver 200.

The wireless power receiver 200 may create the list (for example, a first communication protocol list) and transmit it to the wireless power transmitter 100. Here, the list may be transmitted to the wireless power transmitter 100 in the format of a packet, and the transmission method is the same as the aforementioned.

The wireless power transmitter 100 may then create a communication protocol list (for example, a second communication protocol list), which includes its supportable communication protocols of the communication protocols included in the received list, in the same format as the received list, transmitting the created list to the wireless power receiver 200.

In one exemplary embodiment, the wireless power transmitter 100 or the wireless power receiver 200 may transmit or receive the communication protocol list in the format of a packet.

A packet including the communication protocol list may be transmitted by use of a user definition area specified in the conventional specification (for example, WPC standards) (for example, in a reserved bit of a reserved packet type disclosed in the WPC standards or a conventionally used packet type).

FIG. 24 is an exemplary view illustrating types of packets in accordance with one exemplary embodiment.

As illustrated in FIG. 24, types of packets in accordance with one exemplary embodiment may be sorted into a packet used in a ping phase (or selection phase, header: 0x01), a packet used in an identification & configuration phase (header: 0x06, 0x51, 0x71, 0x81), a packet used in a power transfer phase (header: 0x02~0x05), and a proprietary packet (or reserved packet, header: 0x18~0xF2). Details are specified in the WPC standard.

The packet including the communication protocol list may be transmitted or received by the wireless power transmitter 100 or the wireless power receiver 200 by use of the proprietary packet.

Also, the packet including the communication protocol list may be transmitted or received by the wireless power transmitter 100 or the wireless power receiver 200 using a reserved bit included in an existing packet.

The existing packet may be at least one of a packet used in the ping phase (header: 0x01), a packet used in the identification & configuration phase (header: 0x06, 0x51, 0x71 and 0x81), and a packet used in the power transfer phase (header: 0x02~0x05).

For example, the existing packet may be a configuration packet (header: 0x51).

Figures 25, 26:
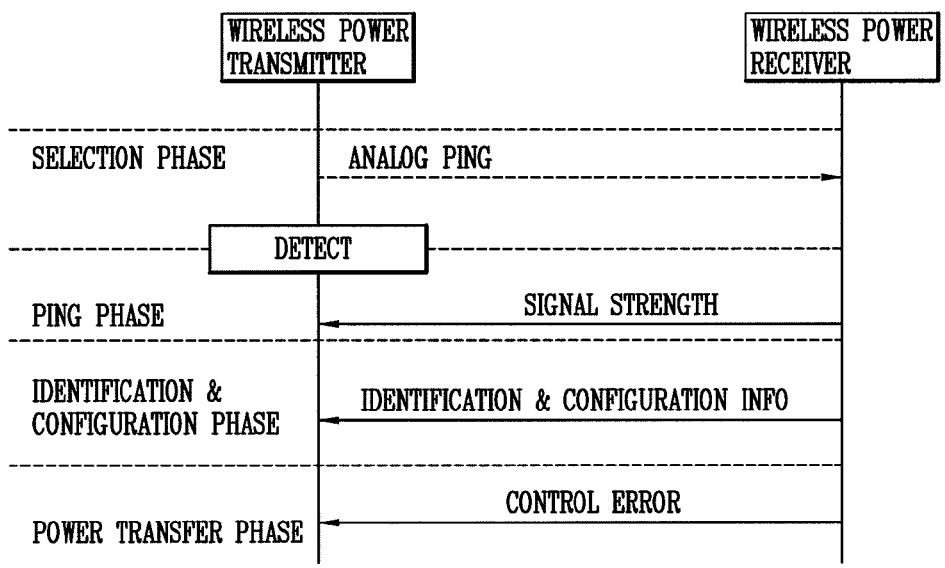
FIG. 25 is an exemplary view illustrating a type (contents) of configuration packet in accordance with one exemplary embodiment.
FIG. 26 is a communication flowchart under Wireless Power Consortium (WPC) standard.

FIG. 25 is an exemplary view illustrating a type of configuration packet in accordance with one exemplary embodiment.

As illustrated in FIG. 25, a configuration packet (header: 0x51) in accordance with one exemplary embodiment may include a plurality of information B0~B4 represented with 8 bits. Details of the configuration packet may be specified in the WPC standards.

Also, the configuration packet may include a plurality of reserved bits.

In one exemplary embodiment, a packet including the communication protocol list may be transmitted or received by the wireless power transmitter 100 or the wireless power receiver 200 using the plurality of reserved bits included in the configuration packet.

FIG. 26 is a communication flowchart under Wireless Power Consortium (WPC) standard.

As illustrated in FIG. 26, the operation phases in a communication flowchart between the wireless power transmitter 100 and the wireless power receiver 200 for wireless power transfer may be divided into the selection phase, the ping phase, the identification & configuration phase and the power transfer phase, as aforementioned.

In the selection phase, it may be detected whether or not objects are present within a range in which the wireless power transmitter 100 can transmit power in a wireless manner (for example, the objects may be detected through the aforementioned analogue ping process).

The ping phase may allow the wireless power transmitter 100 to transmit a ping signal to the detected objects and the wireless power receiver 200 to respond to the ping signal.

In the ping phase, the wireless power receiver 200 may transmit a packet including information related to a signal strength to the wireless power transmitter 100.

Also, the identification and configuration phase may allow the wireless power transmitter 100 to identify the wireless power receiver 200, which has been selected through the previous phases, and to acquire configuration information for power transfer.

The power transfer phase may allow the wireless power transmitter 100 to transfer power to the wireless power receiver 200 with controlling the transmitted power in response to a control message received from the wireless power receiver 200.

The control message may be transmitted to the wireless power transmitter 100 by being included in a packet (for example, a control error packet) 5500, which includes a control error (or error) as illustrated in FIG. 18.

Figure 27:
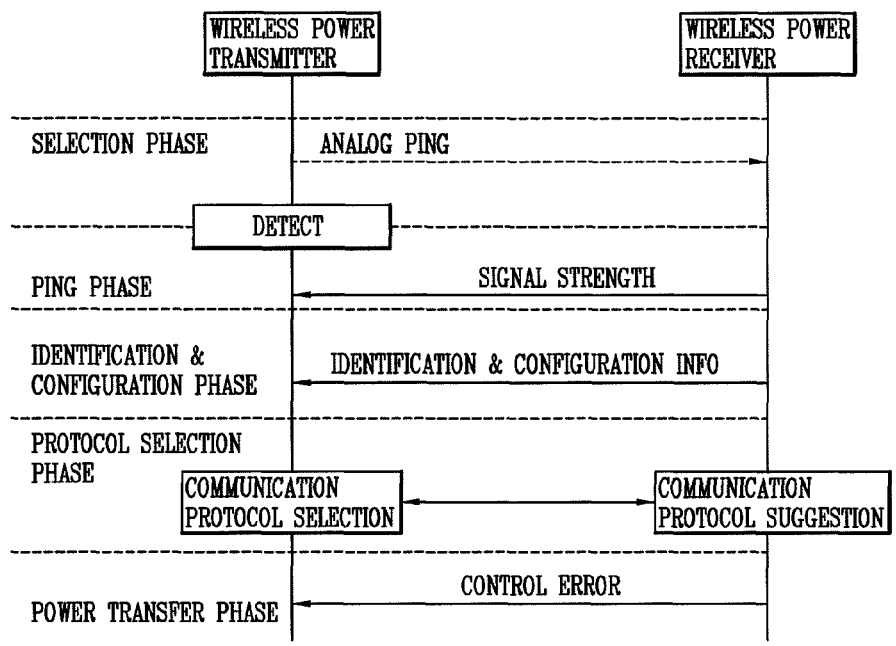
FIG. 27 is a communication flowchart between a wireless power transmitter and a wireless power receiver in accordance with one exemplary embodiment.

FIG. 27 is a communication flowchart between a wireless power transmitter and a wireless power receiver in accordance with one exemplary embodiment.

As illustrated in FIG. 27, a communication flowchart between the wireless power transmitter 100 and the wireless power receiver 200 according to one exemplary embodiment may include a protocol selection phase between the identification & configuration phase and the power transfer phase.

In the protocol selection phase, the wireless power receiver 200 may transfer first communication protocol information, which indicates supportable communication protocols among predetermined communication protocols included in the communication protocol catalogue, to the wireless power transmitter 100 ("communication protocol suggestion" illustrated in FIG. 27).

The wireless power transmitter 100 may decide (or select) a communication protocol based on the first communication protocol information ("communication protocol selection" illustrated in FIG. 27).

The wireless power transmitter 100 may transmit second communication protocol information, which indicates the decided communication protocol, to the wireless power receiver 200.

Figure 28:
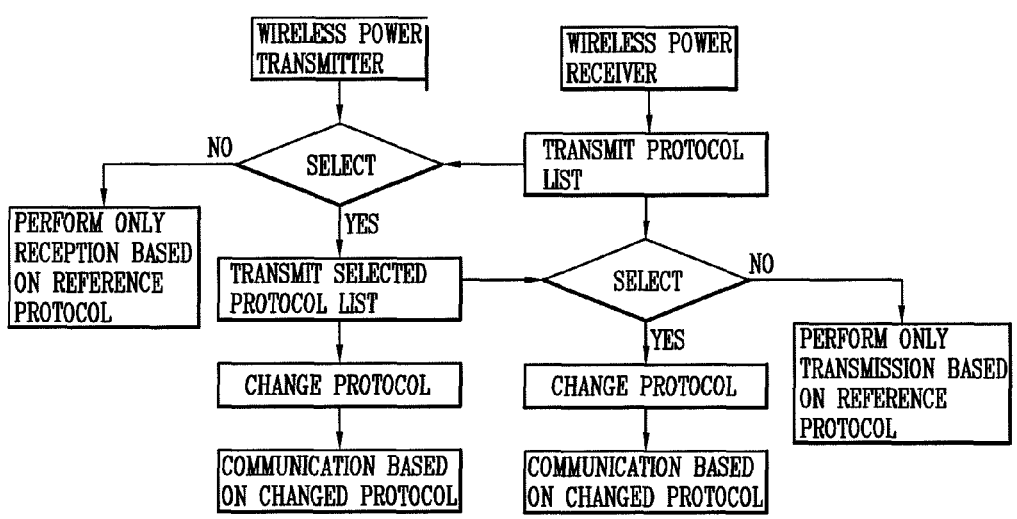
FIG. 28 is an exemplary view illustrating a method for deciding a communication protocol between a wireless power transmitter and a wireless power receiver in accordance with one exemplary embodiment.

FIG. 28 is an exemplary view illustrating a method for deciding a communication protocol between a wireless power transmitter and a wireless power receiver in accordance with one exemplary embodiment.

As illustrated in FIG. 28, the wireless power receiver 100 may transmit a list of supportable communication protocols (or first communication protocol information) to the wireless power transmitter 200.

The wireless power transmitter 100 may determine whether or not it is able to select a communication protocol based on the communication protocol list.

When the wireless power transmitter 100 is unable to select a communication protocol based on the communication protocol list (for example, when it fails to receive the communication protocol list or has no supportable communication protocol), the wireless power transmitter 100 may perform only reception based on a reference protocol (or reference communication protocol) to transmit power to the wireless power receiver 200 in a wireless manner. Here, a unidirectional communication by the wireless power receiver 200 may merely be performed.

The reference communication protocol may be a communication protocol for ensuring data transmission or data reception between the wireless power transmitter 100 and the wireless power receiver 200.

When the wireless power transmitter 100 is able to select a communication protocol based on the communication protocol list, it may transmit the communication protocol list (or the second communication protocol information) including the selected communication protocol to the wireless power receiver 200.

The wireless power transmitter 100 may also change a communication protocol to the selected communication protocol.

The wireless power receiver 200 may determine whether or not it is able to decide (or select) a communication protocol based on the selected communication protocol list.

When the wireless power receiver 200 is unable to decide (or select) a communication protocol based on the selected communication protocol list (for example, when it fails to receive the selected communication protocol list), the wireless power receiver 200 may perform only transmission based on the reference communication protocol. Here, a unidirectional communication by the wireless power receiver 200 may merely be performed.

When the wireless power receiver 200 is able to decide (or select) a communication protocol based on the selected communication protocol list, it may change a communication protocol to the decided (selected) communication protocol.

Afterwards, the wireless power transmitter 100 and the wireless power receiver 200 may perform communication therebetween based on the decided (or selected) communication protocol.

Method for Deciding Communication Protocol by Wireless Power Receiver

A method for deciding a communication protocol by a wireless power receiver in accordance with one exemplary embodiment is for the wireless power receiver to decide a communication protocol for performing data transmission or data reception with a wireless power transmitter. The method performed by the wireless power receiver may include transmitting first communication protocol information indicating communication protocols supportable by the wireless power receiver itself to the wireless power transmitter, and deciding a communication protocol for data transmission or data reception based on second communication protocol information, which indicates communication protocols selected based on the first communication protocol information, when the second communication protocol information is received from the wireless power transmitter.

In one exemplary embodiment, the first communication protocol information may include a communication protocol list in which communication protocols supportable by the wireless power receiver are listed.

In one exemplary embodiment, the communication protocols supportable by the wireless power receiver may be selected from predetermined communication protocols included in a communication protocol catalog.

Also, in one exemplary embodiment, the second communication protocol information may include a communication protocol list in which communication protocols selected based on the first communication protocol information are listed.

In one exemplary embodiment, when the selected communication protocols are in plurality, the decision of the communication protocol may be executed based on positions of the selected communication protocols in the communication protocol list containing the selected communication protocols.

In one exemplary embodiment, the method may further include performing the data transmission or data reception with the wireless power transmitter based on the decided communication protocol.

In one exemplary embodiment, the transmitting of the first communication protocol information to the wireless power transmitter may include generating a packet including the first communication protocol information, and transmitting the generated packet to the wireless power transmitter.

In one exemplary embodiment, the packet may be transmitted by modulating a wireless power signal generated by the wireless power transmitter to include the packet.

In one exemplary embodiment, the packet may be transmitted by a communication module provided in the wireless power receiver.

In one exemplary embodiment, the communication module may support at least one of Zigbee, Bluetooth and Near Field Communication (NFC).

In one exemplary embodiment, the first communication protocol information or the second communication protocol information may include communication direction information and a communication protocol number indicating the type (or title, description, contents, etc.) of communication protocol.

In one exemplary embodiment, the communication direction information may include information, which indicates a first direction that data is transmitted from the wireless power transmitter to the wireless power receiver, and a second direction that data is transmitted from the wireless power receiver to the wireless power transmitter.

In one exemplary embodiment, the selected communication protocols may include a communication protocol corresponding to the first direction and a communication protocol corresponding to the second direction.

In one exemplary embodiment, the first communication protocol information or the second communication protocol information may be 7-bit information. Here, the communication direction information may be 1-bit information, and the communication protocol number information may be 6-bit information.

In one exemplary embodiment, the method may further include performing the data transmission or data reception with the wireless power transmitter based on a reference communication protocol upon failure of reception of the second communication protocol information from the wireless power transmitter.

In one exemplary embodiment, the reference communication protocol may be a communication protocol for ensuring data transmission or data reception between the wireless power transmitter and the wireless power receiver.

Figure 29:
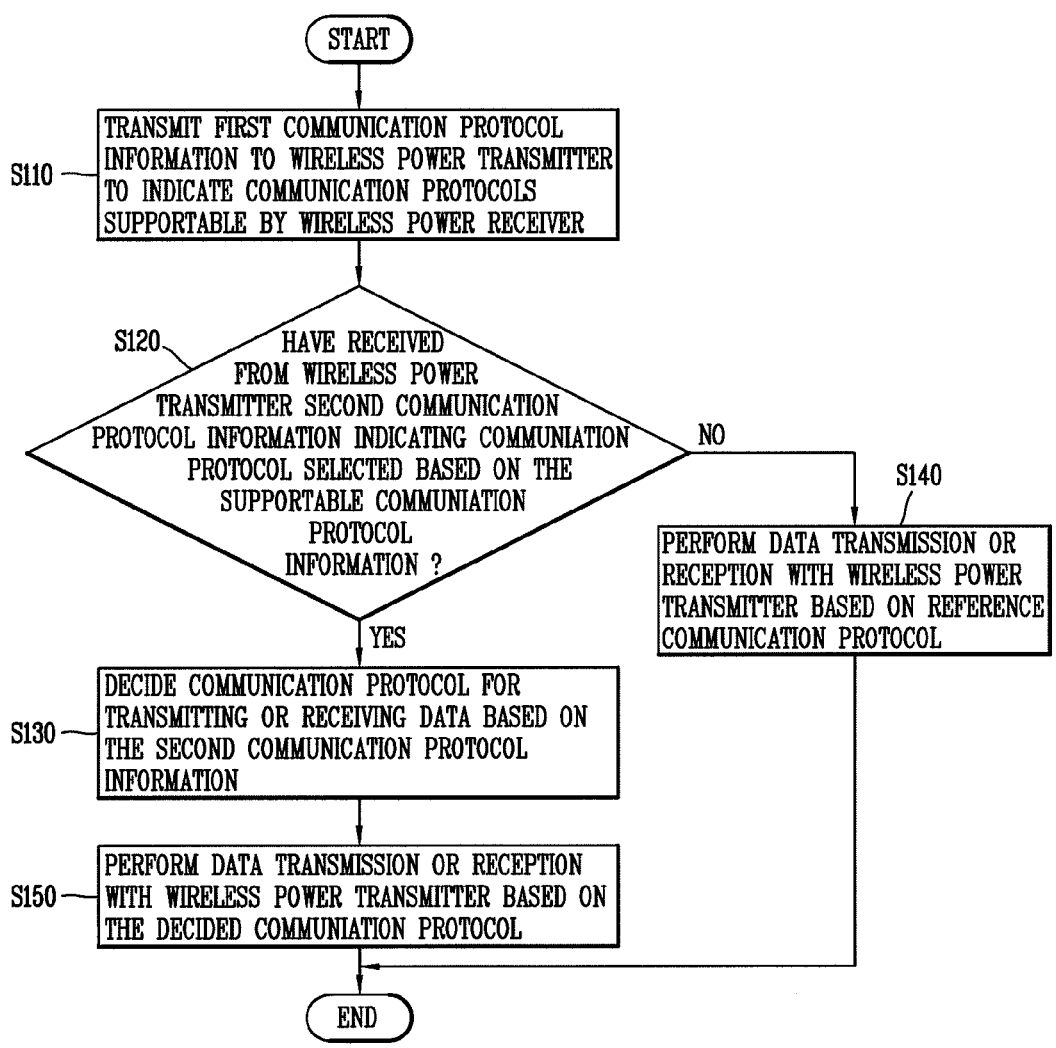
FIG. 29 is a flowchart illustrating a method for deciding a communication protocol by a wireless power receiver in accordance with one exemplary embodiment.

FIG. 29 is a flowchart illustrating a method for deciding a communication protocol by a wireless power receiver in accordance with one exemplary embodiment.

As illustrated in FIG. 29, a method for deciding a communication protocol by a wireless power receiver in accordance with one exemplary embodiment may include the following steps.

First, the wireless power receiver may transmit first communication protocol information, which indicates communication protocols that can be supported by the wireless power receiver, to a wireless power transmitter (S110).

The wireless power receiver may determine whether or not it has received second communication protocol information, which indicates a communication protocol selected based on the first communication protocol information, from the wireless power transmitter (S120).

When it has received the second communication protocol information from the wireless power transmitter, the wireless power receiver may decide a communication protocol for transmitting or receiving the data based on the second communication protocol information (S130).

Here, the wireless power receiver may perform the data transmission or data reception with the wireless power transmitter based on the decided communication protocol (S150).

When it has failed to receive the second communication protocol information from the wireless power transmitter, the wireless power receiver may perform the data transmission or data reception with the wireless power transmitter based on a reference communication protocol (S140).

Method for Deciding Communication Protocol by Wireless Power Transmitter

A method for deciding a communication protocol by a wireless power transmitter in accordance with one exemplary embodiment may be a method in which the wireless power transmitter decides a communication protocol for data transmission or data reception with a wireless power receiver. The method performed by the wireless power transmitter may include deciding a communication protocol based on first communication protocol information, which indicates communication protocols supportable by the wireless power receiver, upon reception of the first communication protocol information from the wireless power receiver, and transmitting second communication protocol information, which indicates the decided communication protocol, to the wireless power receiver.

In one exemplary embodiment, the method may further include performing the data transmission or data reception based on the decided communication protocol.

In one exemplary embodiment, the transmitting of the second communication protocol information to the wireless power receiver may include generating a packet including the second communication protocol information, and transmitting the generated packet to the wireless power receiver.

In one exemplary embodiment, the packet may be transmitted by generating a wireless power signal which has been modulated to include the packet.

In one exemplary embodiment, the packet may be transmitted by a communication module provided in the wireless power transmitter.

In one exemplary embodiment, the communication module may support at least one of Zigbee, Bluetooth and NFC.

In one exemplary embodiment, the first communication protocol information or the second communication protocol information may include communication direction information and a communication protocol number indicating a type (or, title, contents, description, etc.) of the communication protocol.

In one exemplary embodiment, the method may further include performing the data transmission or data reception with the wireless power receiver based on a reference communication protocol upon failure of the reception of the first communication protocol information from the wireless power receiver.

In one exemplary embodiment, the reference communication protocol may be a communication protocol for ensuring the data transmission or data reception between the wireless power transmitter and the wireless power receiver.

Figure 30:
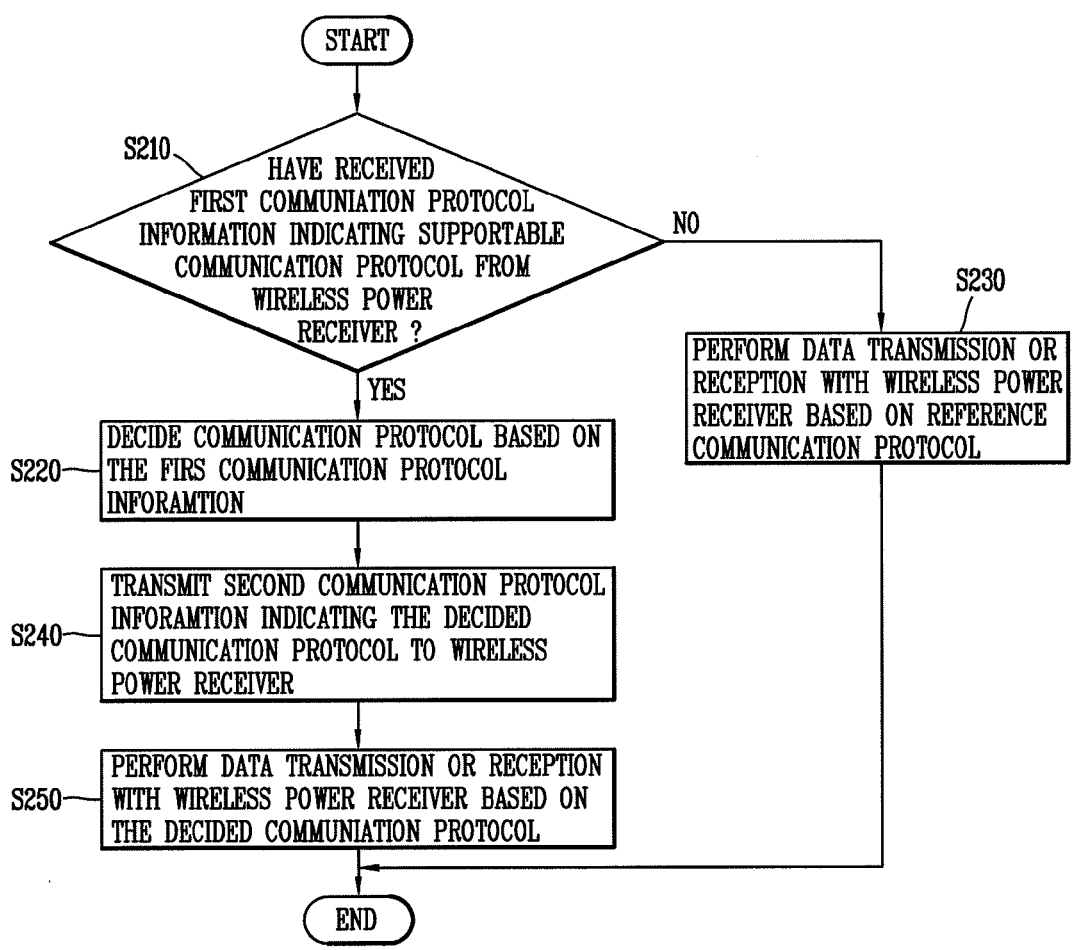
FIG. 30 is a flowchart illustrating a method for deciding a communication protocol by a wireless power transmitter in accordance with one exemplary embodiment.

FIG. 30 is a flowchart illustrating a method for deciding a communication protocol by a wireless power transmitter in accordance with one exemplary embodiment.

As illustrated in FIG. 30, a method for deciding a communication protocol by a wireless power transmitter in accordance with one exemplary embodiment may include the following steps.

First, the wireless power transmitter may determine whether or not it has received first communication protocol information, which indicates communication protocols supportable by a wireless power receiver, from the wireless power receiver (S210).

When it has received the first communication protocol information, the wireless power transmitter may decide a communication protocol based on the first communication protocol information (S220).

Here, the wireless power transmitter may transmit second communication protocol information, which indicates the decided communication protocol, to the wireless power receiver (S240).

Also, the wireless power transmitter may perform data transmission or data reception with the wireless power receiver based on the decided communication protocol (S250).

The wireless power transmitter may perform the data transmission or data reception with the wireless power receiver based on a reference communication protocol upon failure of the reception of the first communication protocol information (S230).

For example, the foregoing methods may be implemented by the control unit (or Controller) 180 or power transmission control unit 112 in the wireless power transmitter 100, or implemented by the controller 280 or Power reception control unit (or POWER RECEIVING CONTROL UNIT) 292 in the electronic device(or the wireless power receiver) 200.

Data may be stored in the memory 150 in the wireless power transmitter 100, and implemented by the control unit (or Controller) 180 or the power transmission control unit 112, and similarly, stored in the memory 260 in the electronic device 200, and implemented by the controller 280 or the Power reception control unit (or POWER RECEIVING CONTROL UNIT) 292.

The invention claimed is:

1. A method for deciding a communication protocol using a wireless power receiver for data transmission or data reception with a wireless power transmitter, the method comprising:
    transmitting a power control message including an end power transfer code indicating a cause for a suspension of wireless power transfer to the wireless power transmitter to update a previous communication protocol to a new communication protocol, wherein the end power transfer code includes a charge complete and a reconfiguration;
    transmitting first communication protocol information to the wireless power transmitter, the first communication protocol information indicating communication protocols supportable by the wireless power receiver;
    determining whether second communication protocol information on a plurality of second communication protocols is received from the wireless power transmitter, the second communication protocol information indicating communication protocols selected by the wireless power transmitter based on the first communication protocol information and the end power transfer code; and
    deciding the new communication protocol for the data transmission or data reception in response to the second communication protocol information on the plurality of second communication protocols being received,
    wherein the first communication protocol information is prioritized to update to the new communication protocol in response to the end power transfer code indicating the reconfiguration, and
    wherein the wireless power transmitter terminates the wireless power transfer and returns to a selection state in response to the end power transfer code indicating the charge complete.

2. The method of claim 1, wherein at least one of the communication protocols supportable by the wireless power receiver is selected from predetermined communication protocols included in a communication protocol catalog.

3. The method of claim 1, wherein the second communication protocol information includes a communication protocol list in which at least one of the communication protocols selected by the wireless power transmitter based on the first communication protocol information is listed.

4. The method of claim 3, wherein when the selected at least one communication protocol is in plurality, the decision of the communication protocol is executed based on positions of the selected communication protocols in the communication protocol list containing the selected communication protocols.

5. The method of claim 1, further comprising:
    performing the data transmission or data reception with the wireless power transmitter based on the decided communication protocol.

6. The method of claim 1, wherein the transmitting of the first communication protocol information to the wireless power transmitter comprises:
    generating a packet including the first communication protocol information; and
    transmitting the generated packet to the wireless power transmitter.

7. The method of claim 6, wherein the packet is transmitted by modulating a wireless power signal generated by the wireless power transmitter to include the packet.

8. The method of claim 6, wherein the packet is transmitted by a communication module provided in the wireless power receiver.

9. The method of claim 8, wherein the communication module supports at least one of Zigbee, Bluetooth and Near Field Communication (NFC).

10. The method of claim 1, wherein the first communication protocol infatuation or the second communication protocol information includes communication direction information and a communication protocol number indicating a different type of the communication protocol including a first type of communication and a second type of communication,
    wherein the communication protocol number is selected according to the communication direction information, and
    wherein a packet modulated based on the first type of the communication protocol is not demodulated with the second type of communication.

11. The method of claim 10, wherein the communication direction information includes information indicating at least one of a first direction that data is transmitted from the wireless power transmitter to the wireless power receiver, and a second direction that data is transmitted from the wireless power receiver to the wireless power transmitter.

12. The method of claim 11, wherein the selected at least one communication protocol includes the first type of communication protocol corresponding to the first direction and the second type of communication protocol corresponding to the second direction.

13. The method of claim 10, wherein the first communication protocol information or the second communication protocol information is 7-bit information, and
    wherein the communication direction information is 1-bit information, and the communication protocol number is 6-bit information.

14. The method of claim 1, further comprising:
    performing the data transmission or data reception with the wireless power transmitter based on a reference communication protocol upon a failure of the reception of the second communication protocol information from the wireless power transmitter.

15. The method of claim 14, wherein the reference communication protocol is a communication protocol for ensuring the data transmission or data reception between the wireless power transmitter and the wireless power receiver.

16. A method for deciding a communication protocol using a wireless power transmitter for data transmission or data reception with a wireless power receiver, the method comprising:

receiving a power control message including an end power transfer code indicating a cause for a suspension of wireless power transfer from the wireless power receiver to update from a previous communication protocol to a new communication protocol, wherein the end power transfer code includes a charge complete and a reconfiguration;

deciding, by the wireless power transmitter, a plurality of communication protocols based on first communication protocol information and the power control message upon reception of the first communication protocol information from the wireless power receiver, the first communication protocol indicating communication protocols supportable by the wireless power receiver;

transmitting second communication protocol information to the wireless power receiver, the second communication protocol information indicating the decided plurality of communication protocols; and performing the data transmission or data reception with the wireless power receiver based on a communication protocol determined at the wireless power receiver, wherein the communication protocol is decided based on the second communication protocol information in response to the second communication protocol information on the plurality of communication protocols being received, wherein the first communication protocol information is prioritized to update to the new communication protocol in response to the end power transfer code indicating the reconfiguration, and wherein the wireless power transmitter terminates the wireless power transfer and returns to a selection state in response to the end power transfer code indicating the charge complete.

17. The method of claim 16, wherein the transmitting of the second communication protocol information to the wireless power receiver comprises:

generating a packet including the second communication protocol information; and transmitting the generated packet to the wireless power receiver.

18. The method of claim 17, wherein the packet is transmitted by a communication module provided in the wireless power transmitter.

19. The method of claim 18, wherein the communication module supports at least one of Zigbee, Bluetooth and Near Field Communication (NFC).

20. The method of claim 16, wherein the first communication protocol information or the second communication protocol information includes communication direction information and a communication protocol number indicating a different type of the communication protocol including a first type of communication and a second type of communication, wherein the communication protocol number is selected according to the communication direction information, and wherein a packet modulated based on the first type of the communication protocol is not demodulated with the second type of communication.

21. The method of claim 16, further comprising:

performing the data transmission or data reception with the wireless power receiver based on a reference communication protocol upon a failure of the reception of the first communication protocol information from the wireless power receiver.

22. The method of claim 21, wherein the reference communication protocol is a communication protocol for ensuring the data transmission or data reception between the wireless power transmitter and the wireless power receiver.

23. A wireless power receiver for wirelessly receiving power from a wireless power transmitter, the wireless power receiver comprising:

a power receiving unit configured to receive a wireless power signal from the wireless power transmitter; and a power reception control unit configured to:

transmit a power control message including an end power transfer code indicating a cause for a suspension of wireless power transfer to the wireless power transmitter to update from a previous communication protocol to a new communication protocol, wherein the end power transfer code includes a charge complete and a reconfiguration, transmit first communication protocol information to the wireless power transmitter, the first communication protocol information indicating communication protocols supportable by the wireless power receiver, determine whether second communication protocol information on a plurality of second communication protocols is received from the wireless power transmitter, the second communication protocol information indicating communication protocols selected by the wireless power transmitter based on the first communication protocol information and the end power transfer code, and decide the new communication protocol for data transmission or data reception in response to the second communication protocol information on the plurality of second communication protocols being received, wherein the first communication protocol information is prioritized to update to the new communication protocol in response to the end power transfer code indicating the reconfiguration, and wherein the wireless power transmitter terminates the wireless power transfer and returns to a selection state in response to the end power transfer code indicating the charge complete.

24. The wireless power receiver of claim 23, further comprising:

a communication module configured to transmit the first communication protocol information to the wireless power transmitter and to receive the second communication protocol information from the wireless power transmitter.

25. A wireless power transmitter for wirelessly transferring power to a wireless power receiver, the wireless power transmitter comprising:

a power conversion unit configured to generate a wireless power signal and to transmit the wireless power signal to the wireless power receiver; and a power transmission control unit configured to:

receive a power control message including an end power transfer code indicating a cause for a suspension of wireless power transfer from the wireless power receiver to update from a previous communication protocol to a new communication protocol, wherein the end power transfer code indicates a reconfiguration, decide a plurality of communication protocols for data transmission or data reception for transmitting the wireless power signal based on first communication protocol information and the power control message upon receiving the first communication protocol information from the wireless power receiver, the first communication protocol information indicating communication protocols supportable by the wireless power receiver, transmit second communication protocol information to the wireless power receiver, the second communication protocol information indicating the decided plurality of communication protocols, and perform the data transmission or data reception with the wireless power receiver based on a communication protocol determined at the wireless power receiver based on the second communication protocol information, wherein the communication protocol is decided based on the second communication protocol information in response to the second communication protocol information on the plurality of communication protocols being received, wherein the first communication protocol information is prioritized to update to the new communication protocol in response to the end power transfer code indicating the reconfiguration, and wherein the wireless power transmitter terminates the wireless power transfer and returns to a selection state in response to the end power transfer code indicating a charge complete.

* * * * *